US007415436B1

(12) United States Patent
Evelyn et al.

(10) Patent No.: US 7,415,436 B1
(45) Date of Patent: Aug. 19, 2008

(54) SYSTEM AND METHOD FOR PRICING AND ALLOCATION OF COMMODITIES OR SECURITIES

(75) Inventors: Michael H. Evelyn, Far Hills, NJ (US); Robert S. Goldberg, Brookville, NY (US); Jordan M. Hayes, Berkeley, CA (US); Cliff M. Gerrish, San Francisco, CA (US); Othar Hansson, Union City, CA (US); Charles A. Ocheret, Scarsdale, NY (US)

(73) Assignee: W. R. Hambrecht + Co., LLC, San Francisco, CA (US)

( * ) Notice: Subject to any disclaimer, the term of this patent is extended or adjusted under 35 U.S.C. 154(b) by 1058 days.

(21) Appl. No.: 09/668,255

(22) Filed: Sep. 21, 2000

Related U.S. Application Data

(60) Provisional application No. 60/187,800, filed on Mar. 8, 2000.

(51) Int. Cl.
*G06Q 40/00* (2006.01)
*G07F 7/00* (2006.01)
*H04L 9/00* (2006.01)
(52) U.S. Cl. .............................. 705/37; 705/27; 705/80
(58) Field of Classification Search ............. 705/35–37, 705/27, 80
See application file for complete search history.

(56) References Cited

U.S. PATENT DOCUMENTS

| 3,581,072 | A | 5/1971 | Nymeyer |
| 4,789,928 | A | 12/1988 | Fujisaki |
| 4,903,201 | A | 2/1990 | Wagner |
| 4,980,826 | A | 12/1990 | Wagner |
| 5,077,665 | A | 12/1991 | Silverman et al. |
| 5,101,353 | A | 3/1992 | Lupien et al. |
| 5,136,501 | A | 8/1992 | Silverman et al. |
| 5,193,056 | A | 3/1993 | Boes |
| 5,243,515 | A | 9/1993 | Lee |
| 5,297,031 | A | 3/1994 | Gutterman et al. |
| 5,375,055 | A | 12/1994 | Togher et al. |
| 5,497,317 | A | 3/1996 | Hawkins et al. |

(Continued)

FOREIGN PATENT DOCUMENTS

KR           3771239 B   *   3/2003

(Continued)

OTHER PUBLICATIONS

Friedman, Jack P.; "Barron's Business Guides: Dictionary of Business Terms; Third Edition"; 1994 and 2000; p. 207.*

(Continued)

*Primary Examiner*—James P. Trammell
*Assistant Examiner*—Daniel L Greene
(74) *Attorney, Agent, or Firm*—Bromberg & Sunstein LLP

(57) ABSTRACT

The present invention provides an economical, high performance, adaptable system and method (designated "the Open-Book system") for conducting an auction of debt securities to institutional and individual investors on the Web. In the Open-Book system auction: (1) Bidders are rewarded for anonymously revealing their bids early; (2) All winners pay a single market-clearing price that sells out the securities; and (3) All participants can monitor the auction in real time. The Open-Book system thus creates a transparent and low-cost new issue market; offers all bidders equal access to securities; and gives both investors and issuers a "seat on the syndicate desk."

33 Claims, 21 Drawing Sheets

U.S. PATENT DOCUMENTS

| | | | |
|---|---|---|---|
| 5,502,637 A | | 3/1996 | Beaulieu et al. |
| 5,640,569 A | | 6/1997 | Miller et al. |
| 5,774,176 A | | 6/1998 | Carter |
| 5,774,880 A | | 6/1998 | Ginsberg |
| 5,794,207 A | | 8/1998 | Walker et al. |
| 5,794,219 A | | 8/1998 | Brown |
| 5,802,501 A | | 9/1998 | Graff |
| 5,809,483 A | | 9/1998 | Broka et al. |
| 5,835,896 A | * | 11/1998 | Fisher et al. ............... 705/37 |
| 5,845,266 A | | 12/1998 | Lupien et al. |
| 5,857,176 A | | 1/1999 | Ginsberg |
| 5,905,974 A | * | 5/1999 | Fraser et al. ............ 705/36 R |
| 5,905,975 A | | 5/1999 | Ausubel |
| 5,915,209 A | | 6/1999 | Lawrence |
| 5,924,083 A | | 7/1999 | Silverman et al. |
| 5,946,667 A | | 8/1999 | Tull, Jr. et al. |
| 5,995,947 A | | 11/1999 | Fraser et al. |
| 6,014,627 A | | 1/2000 | Togher et al. |
| 6,026,383 A | | 2/2000 | Ausubel |
| 6,035,287 A | | 3/2000 | Stallaert et al. |
| 6,044,363 A | * | 3/2000 | Mori et al. .................. 705/37 |
| 6,058,379 A | * | 5/2000 | Odom et al. ................. 705/37 |
| 6,161,099 A | | 12/2000 | Harrington et al. |
| 6,269,343 B1 | * | 7/2001 | Pallakoff .................... 705/26 |
| 6,272,473 B1 | * | 8/2001 | Sandholm .................. 705/37 |
| 6,285,989 B1 | * | 9/2001 | Shoham ..................... 705/37 |
| 6,493,683 B1 | * | 12/2002 | David et al. ................ 705/37 |
| 6,519,570 B1 | * | 2/2003 | Faber et al. .................. 705/8 |
| 6,604,089 B1 | * | 8/2003 | Van Horn et al. ........... 705/26 |
| 6,606,607 B1 | * | 8/2003 | Martin et al. ............... 705/37 |
| 6,629,082 B1 | * | 9/2003 | Hambrecht et al. ...... 705/36 R |
| 6,631,356 B1 | * | 10/2003 | Van Horn et al. ........... 705/26 |
| 6,718,312 B1 | * | 4/2004 | McAfee et al. ............. 705/37 |
| 2001/0034692 A1 | | 10/2001 | McRedmond |

FOREIGN PATENT DOCUMENTS

| | | |
|---|---|---|
| WO | WO 00/51047 A2 | 8/2000 |

OTHER PUBLICATIONS

Cramton, Peter: Ascending Auctions; European Economic Review 42:3-5; 1998; pp. 1-11.*

What is Proxy Bidding?, pp. 1-3, WiseGEEK, available @ http://www.wisegeek.com/what-is-proxy-bidding.htm, last accessed Jul. 2, 2007.*

Tips for Buyers, pp. 1-3, E-bay, Oct. 13, 1999, available @ http://web.archive.org/web/19991013024945/pages.ebay.com/help/buyerguide/bidding-tips.html, last accessed Jul. 24, 2007.*

Bicknell, "IPOs for the Everyman", Wire News Feb. 8, 1999, 1 pg.

Bransten et al., "New Company Aims to Shift IPO Playing Field", Wall Str. J., Feb. 8, 1999 C1.

Carlsen, "Veteran bankers use Net power to fuel IPO market", SF Business Times, Feb. 12, 1999, pp. 20, 23.

CNNfn, "IPOs for the public—really!", Feb. 8, 1999, 1 pg.

Daly, "West Coast firm sets new way for IPOs", CBS Market Watch Report, Feb. 8, 1999, 1 pg.

Davis, "The Underwriting Underdog", Business 2.0, 7 pgs.

Edwards et al., Nat. Pub. Radio, morning edition 10:00 am on ET, Feb. 12, 1999, 1 pg.

Friedman "A Toast to Open IPO From the 'Little Guy'", Los Angeles Times, Apr. 13, 1999, 1 pg.

Gates, "The next generation of i-banking", Red Herring, The Bus. of Technology, Feb. 9, 1999, 1 pg.

Gerhard, "A Secure Electronic Market for Anonymous Transferable Emission Permits", IEEE Comp. Soc, 1998, 232-241.

Gilpin, "How the Web Can Improve Corporate Underwriting", The N.Y. Times, Feb. 14, 1999, 1 pg.

Gorda et al., "Building and Running Online Auctions", Dr. Dobb's Journal, Oct. 1997, pp. 84-104.

Hansell, "Internet Auction System Set For Pricing Stock Offerings", The N. Y. Times, Feb. 8, 1999, C7.

Harkavy et al., "Electronic Auctions with Private Bids", 3rd USENIX Workshop on Electronic Commerce, pp. 61-73, Aug. 31-Sep. 3, 1998.

Henry, "Street Talk", USA Today, Feb. 9, 1999, 1 pg.

Hambrecht, "Dutch Treat", Time digital, May 17, 1999.

"New Approach to Investment Banking With Launch of Open IPO", IPO Monitor, San Francisco, Feb. 8, 1999, 2 pgs.

Junnarkar, "Bringing auction-based IPOs to the Web", Cnet News. Com, Feb. 8, 1999.

Kikuchi et al., "Multi-Round Anonymous Auction Protocols", IEICE Trans. Inf. & Syst. vol. E82-D, No. 4, 1999, pp. 769-776.

Kumar et al., "Internet Auctions", 3rd USENIX Workshop on Electronic Comm. Aug. 31-Sep. 3, 1998, pp. 49-60.

Landes, D. V., Aug. 16, 1996 Letter with attachments.

Markus et al., "Sonoma's Ravenswood to Offer Public Shares Over Internet", Wine Spectator, Apr. 30, 1999, 1 pg.

The Motley Fool, "Putting the 'I' in IPO", Feb. 8, 1999, 1 pg.

Mullen et al., "The Auction manager: Market Middleware for Large-Scale Electronic Commerce", 3rd USENIX Workshop on Electronic Comm. Aug. 31-Sep. 3, 1998, pp. 37-47.

Mulligan, "Internet Auction System Challenges Wall Street", Los Angeles Times, Feb. 9, 1999, 1 pg.

O'Connor, "Internet site bids for investors", Financial Times, May 18, 1999, 2 pgs.

Rohm et al., "COPS: A Model and Infrastructure for Secure and Fair Electronic Markets", Proceedings of the 32nd Hawaii International Conference on System Sciences, 1999, 10 pgs.

"IPOs online a boost for small investor", San Jose Mercury News, Feb. 15, 1999, 2 pgs.

Stone, "How About IPOs for the Masses?", Newsweek, Business, Feb. 15, 1999, p. 46.

Subramanian et al., "A Real-Time Protocol for Stock Market Transactions", IEEE 1999, pp. 2-10.

Thomas, R., Aug. 28, 1996 Letter with attachment.

Wurman et al., "Flexible double auctions for electronic commerce: theory and implementation", Elsevier Science, Decision Support Systems 24, 1998, pp. 17-27.

Young, "An IPO that's for everyone", The Sacramento Bee, Mar. 3, 1999, 2 pgs.

Zimmerman et al., "A web-based platform for experimental investigation of electric power auctions", Elsevier Science, Decision Support Systems 24, 1999, pp. 193-205.

"Sample Form of MuniBid™ Notice of Sale", 9 pgs.

Brochure, "Introduction to MuniBid™ Optimizing Municipal Bond Sales", 13 pgs.

Pamphlet entitled MuniBid.

Resnick, Parity On-Line Bidding Program Wins Positive Reviews, The Bond Buyer, May 7, 1997.

Parity . . . and the Municipal Securities Issuer, author and date unknown.

Parity brochure, Copyright 1992, 21st Century Municipals, Inc.

"Internet Benefits SF Redevelopment Offering", CA Public Finance, v. 10, No. 21, p. N/A, Jan. 13, 1997.

Dazzo N. J., "In Today's Muni Market, Data Bases, Not Books, Provide Dealers, Clients with timely Bond Data: Municipal bond dealers have never had it so easy", The Bond Buyer, v. 289,#2821, Aug. 29, 1989.

JP Morgan and Capital Link in Bid to develop Electronic Auction for Corporate Debt Securities, Trading Systems, Technology, c2, No. 20, Apr. 24, 1989.

"Grant Street Advisors Is Setting Up The First Muni Bond Auction Web Site", The Bond Buyer, v 320, #30159, p. 1, Jun. 4, 1997.

Richmeyer R., "Survey Shows Bond Market is Warming up to Electronic Trading", The Bond buyer, v 321, #30213, Aug. 20, 1997.

Stirland, "News and Trends: Brokers-Dealers to hawk Products Via Satelite and cable TV", The Bond Buyer, v 320, #30125, Apr. 16, 1997.

U.S. Trademark File History for mark "Parity & Design", (Reg. No. 1772581) including specimen entitled "Parity A Real-Time, No-Risk Bidding Network From 21 Century Municipals", (1992).

Morgenstern, "Electronic Bidding for Municipal Bonds: Technology Innovation for Competitive Bond Sales", pp. 23-25 Government Finance Review (Feb. 2000).

Richtmyer, "Gaining Parity: Dalcomp Purchases Electronic Bid System to Expoit Internet"; The Bond Buyer (Feb. 25, 1998).
Whalen, Where is Dalcomp? New Product Awaits Inaugural Deal, The Bond Buyer Aug. 19, 1998.
Whalen, "Dalcomp's Electronic Bidding System Set to Debut With Wisconsin Go Deal", Bond Buyer, Aug. 21, 1998.
Fax from Parity, Apr. 30, 1996.
Document entitled: Q: What Do These Issues Have in Common? Official Notice of Sale, Tennesse Local Development Authority.
Bid Form Tennessee Local Development Authority; Parity Bid Form; Parity Form of Agreement; Suggested language document.
"Financial Advisors/Issuers", document, "The Financial Adviser Receives A Bid Status Report . . . ".
Financial Advisors/Issue document, "Financial Advisors/Issuers see the following data for each bid and for each issue by dialing 206-635-0940 (this information only shows after the deadline for receipt of bids)".
Sarah Stirland, "*Wall Street Is Rattled by Software That Can Remake Competitive Deals*", The Bond Buyer, Aug. 21, 1996, p. 1.
Fujishima, Yuzo, et al., "*Speeding Up Ascending-Bid Auctions*", Stanford University, Stanford, CA, pp. 1-6.
Milgrom, Paul, "*Putting Auction Theory to Work: The Simultaneous Ascending Auction*", Dept. of Economics, Stanford University, Dec. 8, 1997, revised Apr. 21, 1999, pp. 1-25.
U.S. Securities and Exchange Commission, Proposed Rule: Defining the Term "Qualified Purchaser" under the Securities Act of 1933, Release No. 33-8041; File No. S7-23-01.
Epstein, Lee, "Newcomers Guide to the Dutch Auction Process (Securities Auctions)", *Corporate Cashflow Magazine*, vol. 11, No. 3, p. 42(2), Mar. 1990.

F. T. McCarthy, "PopNet Float Shows up the Flaws," *The Financial News*, Feb. 7, 2000, 2 pages.
John M. Dalton, Editor, "The Initial Public Offering," *How the Stock Market Works*, John M. Dalton, Editor, 1993, NYIF Corp., Second Edition, pp. 33-60.
John Downes and John Elliot Goodman, *Dictionary of Finance and Investment Terms*, 1998, Fifth Edition, pp. 132, 243, 600, 275.
David Landes, Letter dated Aug. 16, 1996, from David V. Landes to Dan Veres, with attachment.
IPO: Robertson, Hambrecht tap into the Net.
Hyatte, Michael, Letter to SEC dated Jul. 20, 2000, *2000 WL 1013584 (S.E.C. Action Letter)*.
Ausubel, L.M., et al, "Auctioning Securities", Working Paper, Dept. of Economics, University of Maryland, Mar. 1998.
Biais, B., et al, "IPO Auctions: English, Dutch, . . . French, and Internet", *Journal of Financial Intermediation 11*, pp. 9-36 (2002).
Chemmanur, T.J., et al, "How Should a Firm Go Public? A Dynamic Model of the Choice Between Fixed-Price Offerings and Auctions in IPOs and Privatizations" . EFA 2003 Annual Conference Paper No. 366.
Sherman, A., "Global Trends in IPO Methods: Book Building vs. Auctions", *Journal of Financial Economics*, vol. 78, Issue 3, Dec. 2005, pp. 615-649.
Vickrey, W., "Counterspeculation, Auctions, and Competitive Sealed Tenders", *The Journal of Finance*, The American Finance Association, vol. XVI, 1961.
Vickrey, W., "Auction and Bidding Games" Recent Advances in Game Theory, 1962—Princeton University Press.

* cited by examiner

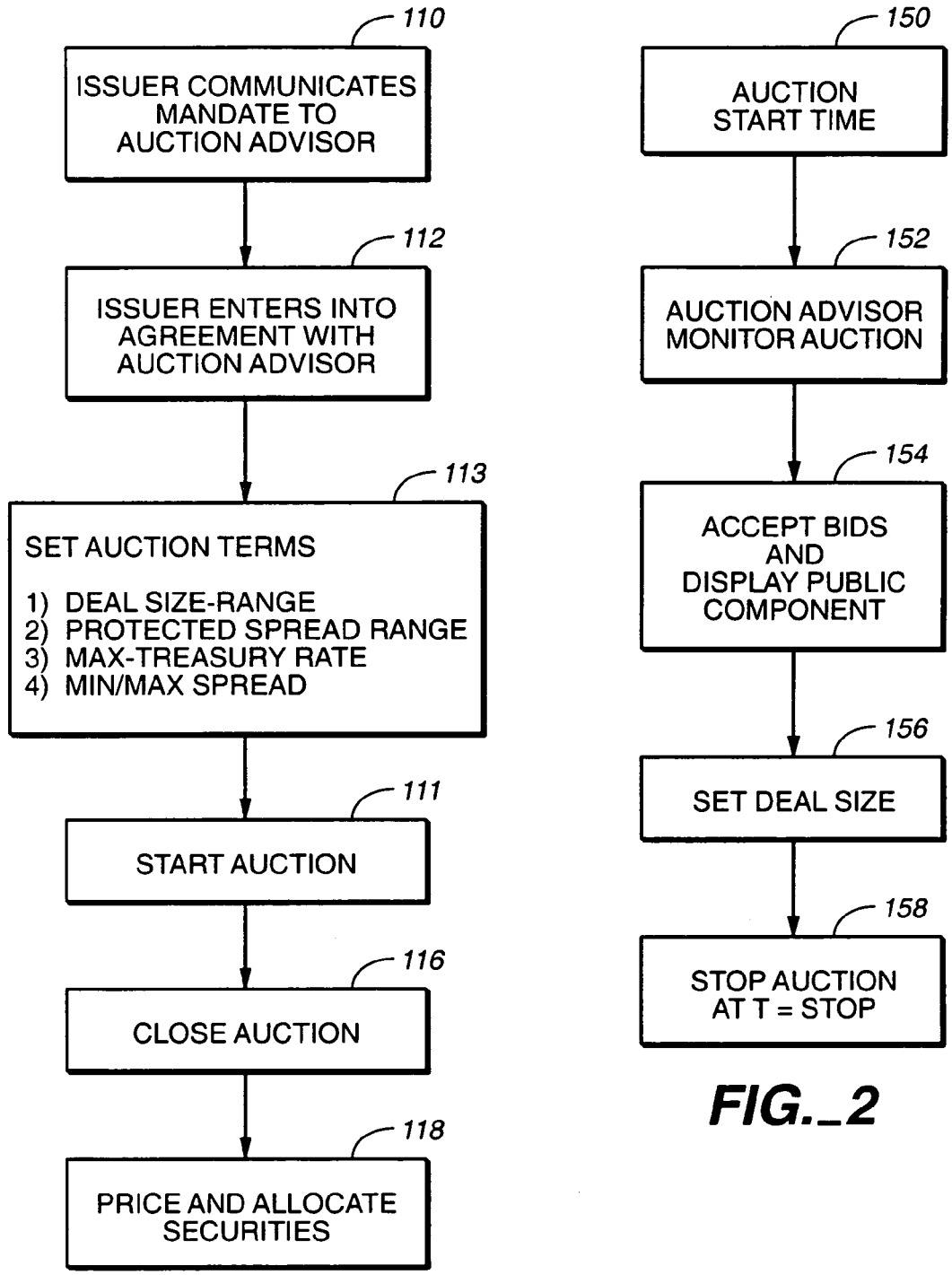
FIG._1
FIG._2

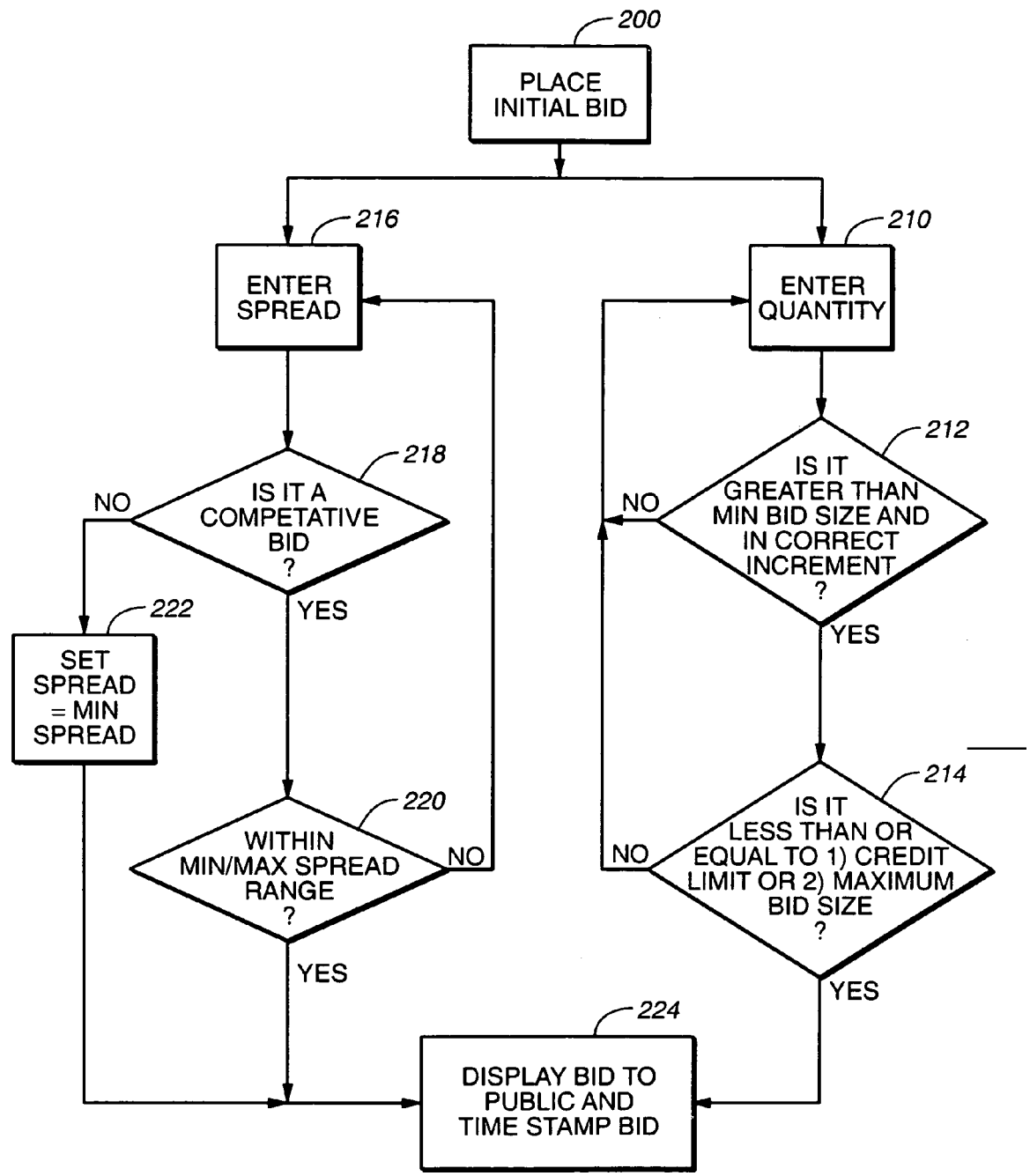
FIG._3

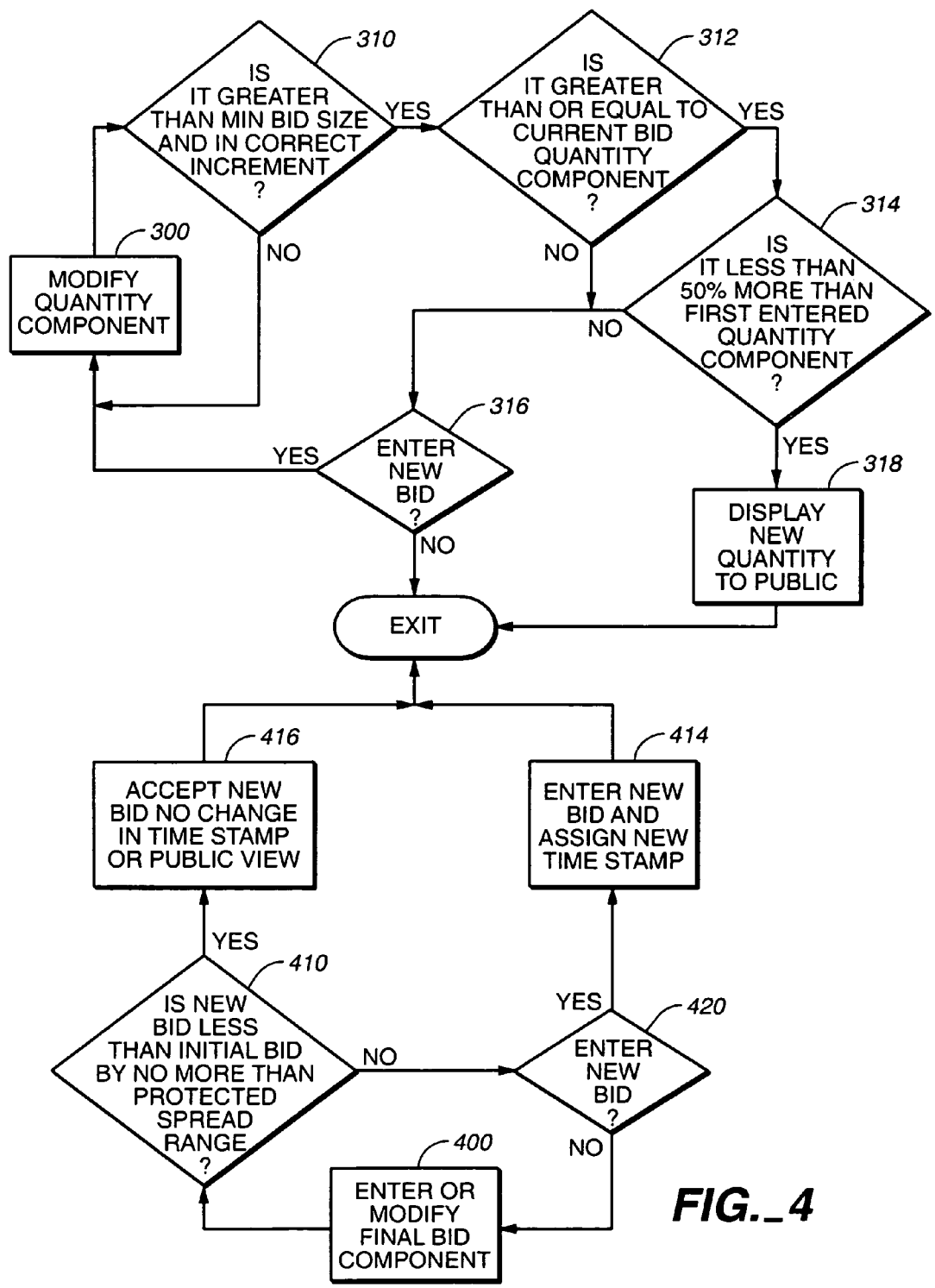
FIG._4

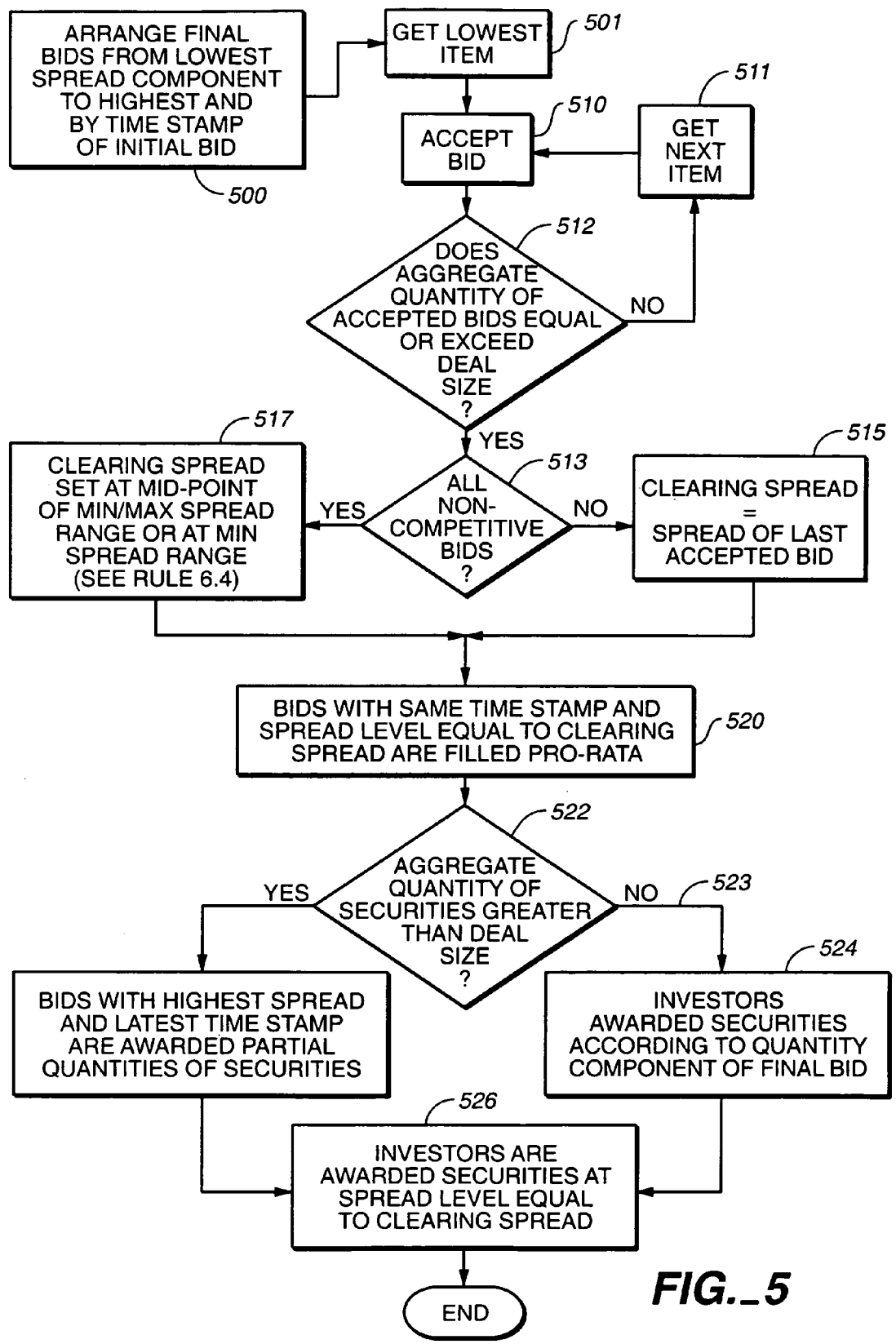
FIG._5

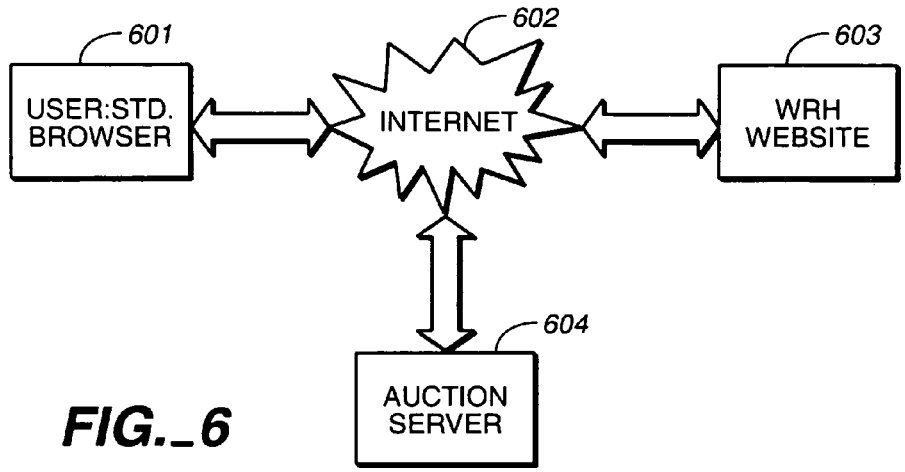
FIG._6
FIG._7

| | |
|---|---|
| Acme $300-450 million 10 year /801 /802<br>Joint Lead Managers: Comanager 1, Comanager 2 | |
| Initial Terms | |
| Issuer | Acme Explosives |
| Issue Size | US$300,000,000 to $450,000,000 (final size set 9/21/99 at 10:00AM ET) |
| Maturity | September 15, 2009 |
| Coupon Rate | Determined by auction as the sum of the benchmark treasury and the auction-clearing spread, rounded down to the nearest 1/8% |
| Settlement Date | September 24, 1999 |
| Settlement Terms | Flat |
| Type of Issue | Public |
| Coupon Dates | March 15; September 15 |
| Structure | Make Whole +20 |
| Format | Book entry DTC |
| Rating | Moody's A1; S&P A+ |
| Benchmark Treasury | 6% August 2009 |
| Maximum Benchmark Rate | 6.2% (auction cancelled if benchmark yield exceeds this rate) |
| Minimum/Maximum Spread | 95/105 basis points over benchmark |
| Protected Spread | 4 bps |
| Auction Date/Time | September 21, 1999, 9:00AM-11:00AM ET |
| Pricing Date/Time | September 21, 1999, 11:30AM ET |
| Maximum Purchase Limit | The lower of your WR Hambrecht credit limit or $75,000,000 |
| Minimum/Multiple | $1,000/$1,000 |
| Listed | NYSE |
| Soft Dollar Terms | 20% on all winning bids time-stamped before 9:30AM ET, 5% on all others |
| Co-Managers | Co-Manager 1, Co-Manager 2 |
| S lling Concession | $1.50 |

FIG._8

| How it Works | Initial Terms | FAQ | Logout |

Acme $300-450 million 10 year | Joint Lead Managers: Comanager 1, Comana

Current Bid Status | Current Time 8:55AM ET

| | Current | Submit | 
|---|---|---|

Auction Progress

Competitive Bid

| Time Stamp | None | |
|---|---|---|
| Size (millions) | $0.000 | $ 00 . 000 |
| Initial Bid | None | Select Spread ▷ |
| Final Bid | None | Select Spread ▷ |

The Auction will start in
5 Minutes

<start page will appear automatically at 0 minutes>

Bids will not be accepted until the auction begins

Non-Competitive Bid

| Time Stamp | None | |
|---|---|---|
| Size (millions) | $0.000 | $ 00 . 000 |
| Max Bid | $75 million | Submit Bid |

Pricing Rationale

Auction Details

| Auction Start | 9:00 AM ET | — 902 |
| Auction Finish | 11:00 AM ET | — 903 |
| Min/Max Spread | 95 - 105 bps | — 904 |
| Protected Spread Range | 4 bps | — 905 |
| Benchmark Treasury | 6% 08/09 | — 906 |

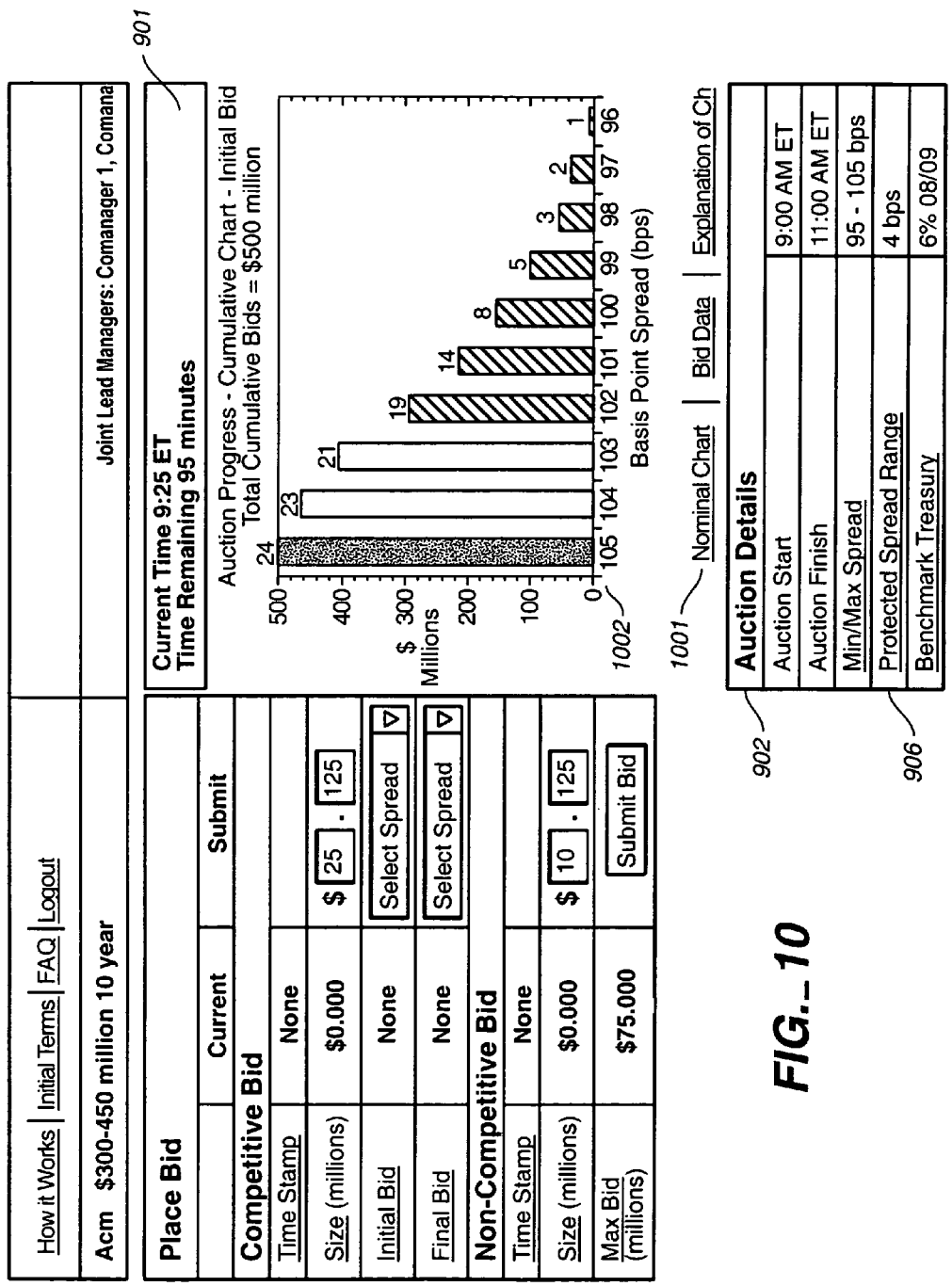
FIG._10

FIG. 11

Acme $300-450 million 10 year

Joint Lead Managers: Comanager 1, Comana

| How it Works | Initial Terms | FAQ | Logout |

Place Bid

Current Time 9:25 ET
Time Remaining 95 minutes

| | Current | Submit |
|---|---|---|
| Competitive Bid | | |
| Time Stamp | None | |
| Size (millions) | $0.000 | $ 25 . 125 |
| Initial Bid | None | Select Spread ▽ |
| Final Bid | None | Select Spread ▽ |
| Non-Competitive Bid | | |
| Time Stamp | None | |
| Size (millions) | $0.000 | $ 10 . 125 |
| Max Bid (millions) | $75.000 | Submit Bid |

Auction Progress - Nominal Chart - Initial Bids
Total Cumulative Bids = $500 million

[Bar chart: $ Millions vs Basis Point Spread (bps) from 96 to 105; bars showing values 1, 1, 2, 3, 6, 5, 2, 2, 1 across spreads]

1102

Cumulative Chart | Bid Data | Explanation of Ch
1103

Auction Details

| Auction Start | 9:00 AM ET |
|---|---|
| Auction Finish | 11:00 AM ET |
| Min/Max Spread | 95 - 105 bps |
| Protected Spread Range | 4 bps |
| Benchmark Treasury | 6% 08/09 |

FIG. 12

| How it Works | Initial Terms | FAQ | Logout | | |
|---|---|---|---|---|---|
| Acme $300-450 million 10 year | | | Joint Lead Managers: Comanager 1, Comana... | | |

Plac Bid — Current Time 9:25 ET / Time Remaining 95 minutes

| | Current | Submit | | Initial Bid | Size | Time Stamp | Initial Bid | Size | Ti St |
|---|---|---|---|---|---|---|---|---|---|
| Competitive Bid | | | | N | 10 | 9:00 | 101 | 8 | 9: |
| Time Stamp | None | | | 97 | 25 | 9:20 | 101 | 15 | 9: |
| Size (millions) | $0.000 | $ 25 . 125 | | 98 | 20 | 9:15 | 101 | 15 | 9: |
| Initial Bid | None | Select Spread ▽ | | 99 | 15 | 9:12 | 102 | 10 | 9: |
| | | | | 99 | 30 | 9:03 | 102 | 14 | 9: |
| Final Bid | None | Select Spread ▽ | | 100 | 10 | 9:08 | 102 | 20 | 9: |
| Non-Competitive Bid | | | | 100 | 20 | 9:06 | 102 | 6 | 9: |
| Time Stamp | None | | | 100 | 25 | 9:21 | 103 | 10 | 9: |
| Size (millions) | $0.000 | $ 10 . 125 | | 101 | 5 | 9:13 | 103 | 75 | 9: |
| Max Bid (millions) | $75.000 | Submit Bid | | 101 | 7 | 9:01 | 103 | 35 | 9: |
| | | | | 101 | 10 | 9:04 | 104 | 40 | 9: |

See remaining bids

▨ Above clearing if initial
☐ Indeterminate
▨ Below clearing if initial

Nominal Chart | Cumulative Chart

Auction Details

| Auction Start | 9:00 AM ET |
|---|---|
| Auction Finish | 11:00 AM ET |
| Min/Max Spread | 95 - 105 bps |
| Protected Spread Range | 4 bps |
| Benchmark Treasury | 6% 08/09 |

1201, 1203, 1204, 1205, 1206, 1207, 1208, 1204, 1205, 1210, 1211, 1202, 906

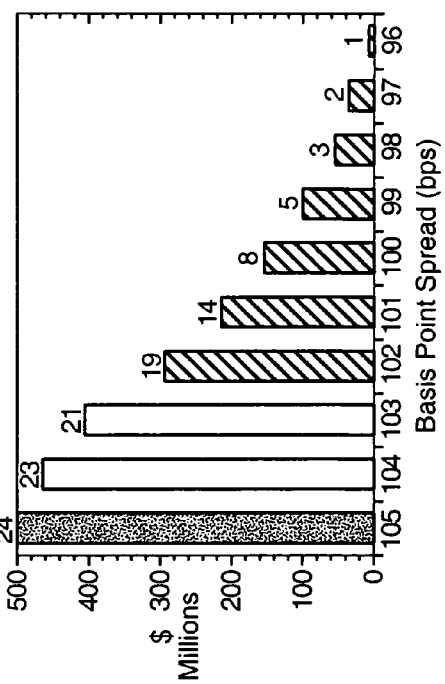
FIG._13

FIG. 14

| How it Works | Initial Terms | FAQ | Logout |

Acme $300-450 million 10 year

Joint Lead Managers: Comanager 1, Comana

Please Confirm Modification

Current Time 9:25 ET
Time Remaining 95 minutes — 1503

Click Confirm Bid to verify your modification.

Auction Progress - Cumulative Chart - Initial Bid
Total Cumulative Bids = $500 million

Competitive Bid — 1203

| | Current | Modification |
|---|---|---|
| Time Stamp | 09:25AM ET | |
| Size (millions) | $25.125 | $25.125 |
| Initial Bid | 104 bps | 104 bps |
| Final Bid | 103 bps | 102 bps |

Non-Competitive Bid — 1207

| | Current | Modification |
|---|---|---|
| Time Stamp | 09:25AM ET | |
| Size (millions) | $10.125 | $10.125 |
| Max Bid (millions) | $75.000 | |

[Back] — 1501    [Confirm Bid] — 1502

Nominal Chart | Bid Data | Explanation of Ch

Auction Details

| | |
|---|---|
| Auction Start | 9:00 AM ET |
| Auction Finish | 11:00 AM ET |
| Min/Max Spread | 95 - 105 bps |
| Protected Spread Range | 4 bps |
| Benchmark Treasury | 6% 08/09 |

*FIG. 15*

| How it Works | Initial Terms | FAQ | Logout |

| Acme $300-450 million 10 year | Joint Lead Managers: Comanager 1, Comana |

Review Bid

Current Time 9:25 ET
Time Remaining 95 minutes

WARNING

Your final bid is outside of the protected spread. Accepting this bid will result in a loss of current time stamp.

Click the Submit Bid button to continue with this bid.  — 1606

Auction Progress - Cumulative Chart - Initial Bid
Total Cumulative Bids = $500 million

Competitive Bid

| | Current | New Bid |
|---|---|---|
| Time Stamp | 09:05AM ET | Assigned on Confirmation |
| Size (millions) | $25.125 | $ 25 . 125 ▽ |
| Initial Bid | 104 bps | 100 ▽ |
| Final Bid X | 103 bps | 99 |

Non-Competitive Bid

| | Current | New Bid |
|---|---|---|
| Time Stamp | 09:25AM ET | Assigned on Confirmation |
| Size (millions) | $10.125 | $ 10 . 125 ▽ |
| Max Bid (millions) | $75.000 | |

Back    Submit Bid — 1605

Nominal Chart | Bid Data | Explanation of Ch

Auction Details

| Auction Start | 9:00 AM ET |
| Auction Finish | 11:00 AM ET |
| Min/Max Spread  *906* | 95 - 105 bps |
| Protected Spread Range | 4 bps |
| Benchmark Treasury | 6% 08/09 |

| How it Works | Initial Terms | FAQ | Logout |

Acme $450 million 10 year — Joint Lead Managers: Comanager 1, Comana

| | | Current Time 11:03AM ET |
|---|---|---|
| Your Bid | | Auction Over |
| 1701 → Total Successful Purchase: | $35.250 million | |
| 1704 → Soft Dollars Available on | $7.05 million | |
| 1702 → Size of benchmark for sale $ millions | $ [00] . [000]   Sell Treasuries | |
| 1703 → Must designate by 11:15. Settle to match new issue. | | |
| Competitive | | |
| Time Stamp | 09:25AM ET | |
| Size (millions) | $25.125 | |
| Initial Bid | 100 bps | |
| Final Bid | 99 bps | |
| Non-Competitive | | |
| Time Stamp | 09:25AM ET | |
| Size (millions) | $10.125 | |
| Auction Results | | |
| 1705 → Clearing Spread | 103 bps | |
| 1706 → Final Deal Size | $450 million | |
| 1707 → Time of Final Pricing | 11:30 AM ET | |
| 1708 → Logout + Exit Auction | | |

Auction Progress - Cumulative Chart - Final Bid
Total Cumulative Bids = $700 million

[Bar chart: $ Millions (0–700) vs Basis Point Spread (bps) 105–96; bars: 33, 32, 28, 25, 18, 10, 7, 5, 3, 2]

Nominal Chart | Bid Data | Explanation of Ch

| Auction Details | |
|---|---|
| Auction Start | 9:00 AM ET |
| Auction Finish | 11:00 AM ET |
| Min/Max Spread | 95 - 105 bps |
| Protected Spread Range | 4 bps |
| Benchmark Treasury | 6% 08/09 |

Note: if you do not have an account with WR Hambrecht + Co, we will facilitate the bond trade for your introducing broker.
All settlement, clearing, and account maintenance will be handled by your introducing broker.

| How it Works | Initial Terms | FAQ | Logout |

Acme $450 million 10 year | | Joint Lead Managers: Comanager 1, Comanager 2

Current Time 11:05 ET
Acme $450 million 10 year
Initial Terms

Auction Results

Your bid was not successful during this auction. Thank you for your participation.

| | |
|---|---|
| Clearing Spread | 103 bps |
| Final Deal Size | $450 million |
| Time of Final Pricing | 11:30 AM ET |

Your Bid

| | |
|---|---|
| Time Stamp | 09:25 AM ET |
| Size (millions) | $25.125 |
| Initial Bid | 105 bps |
| Final Bid | 104 bps |

Logout + Exit Auction

| | |
|---|---|
| Issuer | Acme Explosives |
| Issue Size | US$300,000,000 to $450,000,000 (final size set 9/21/99 at 10:00AM ET) |
| Maturity | September 15, 2009 |
| Coupon Rate | Determined by auction as the sum of the benchmark treasury and the auction-clearing spread, rounded down to the nearest 1/8% |
| Settlement Date | September 24, 1999 |
| Settlement Terms | Flat |
| Type of Issue | Public |
| Coupon Dates | March 15; September 15 |
| Structure | Make Whole +20 |
| Format | Book entry DTC |
| Rating | Moody's Aa1; S&P AA+ |
| Benchmark Treasury | 6% August 2009 |
| Maximum Benchmark Rate | 6.2% (auction cancelled if benchmark yield exceeds this rate) |
| Minimum/Maximum Spread | 95/105 basis points over benchmark |
| Protected Spread | 4 bps |
| Auction Date/Time | September 21, 1999, 9:00AM-11:00AM ET |
| Pricing Date/Time | September 21, 1999, 11:30AM ET |

*FIG._18*

| | |
|---|---|
| Maximum Purchase Limit | The lower of your WR Hambrecht credit limit or $75,000,000 |
| Minimum/Multiple | $1,000/$1,000 |
| Listed | NYSE |
| Soft Dollar Terms | 20% on all winning bids time-stamped before 9:30AM ET, 5% on all others |
| Co-Managers | Co-Manager 1, Co-Mangaer 2 |
| Selling Concession | $1.50 |

FIG._19

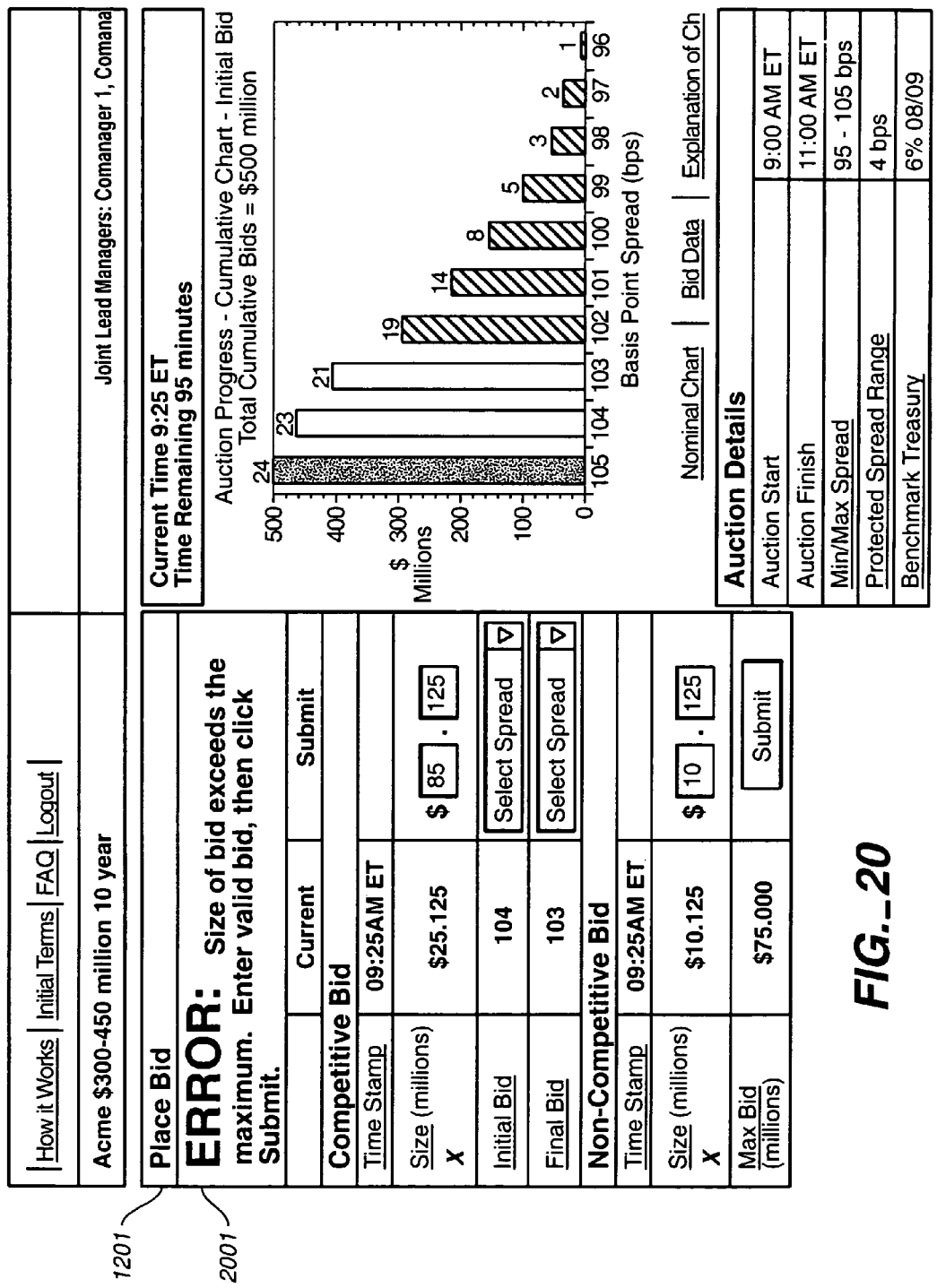
FIG._20

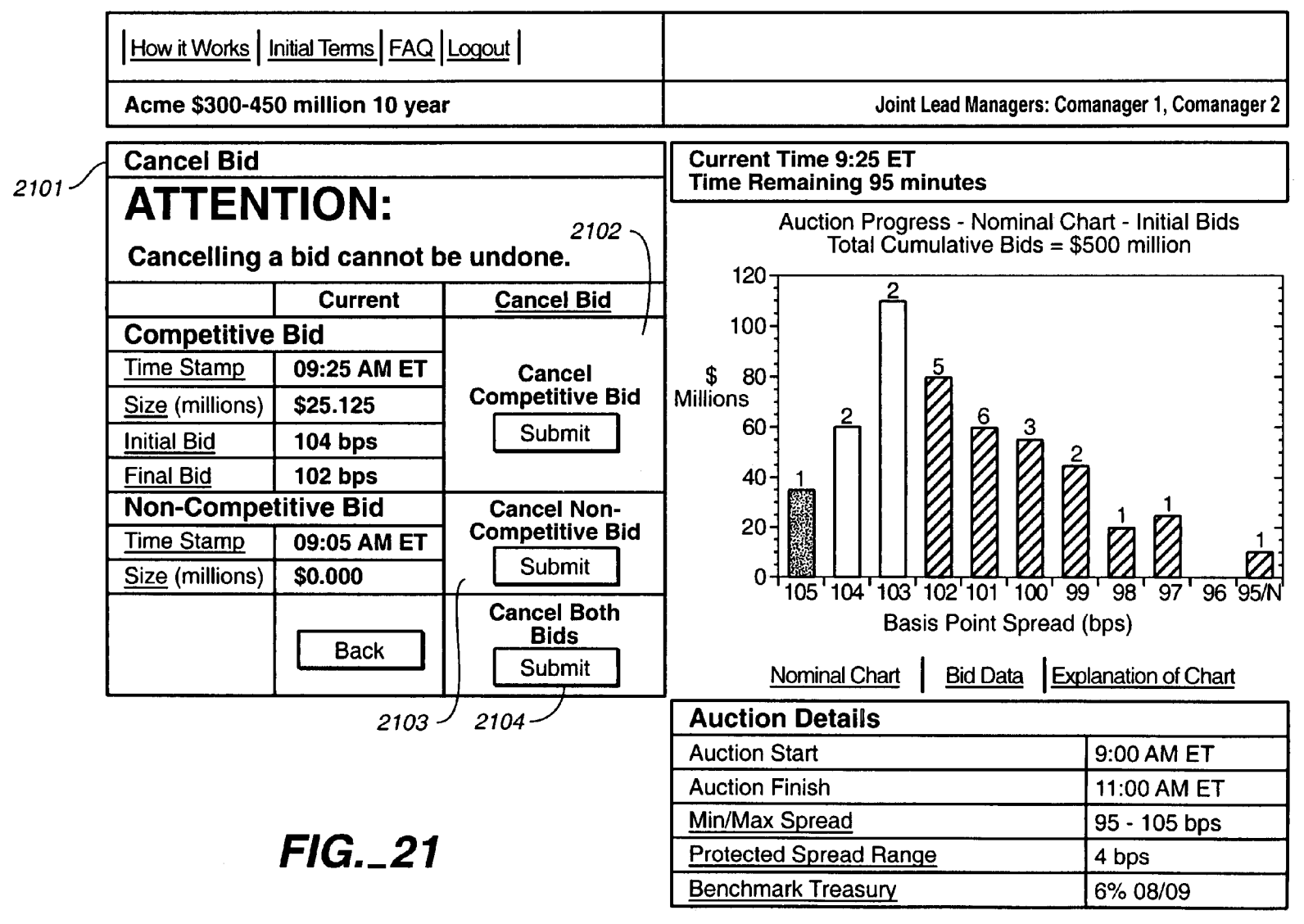

FIG._21

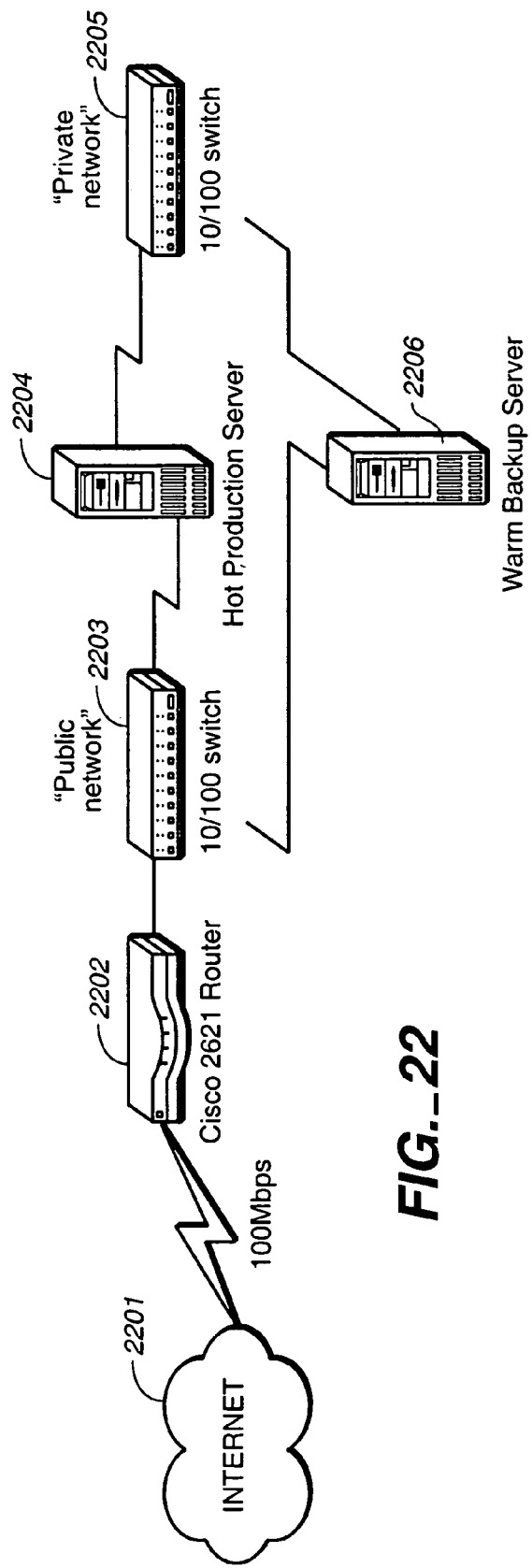
FIG._22
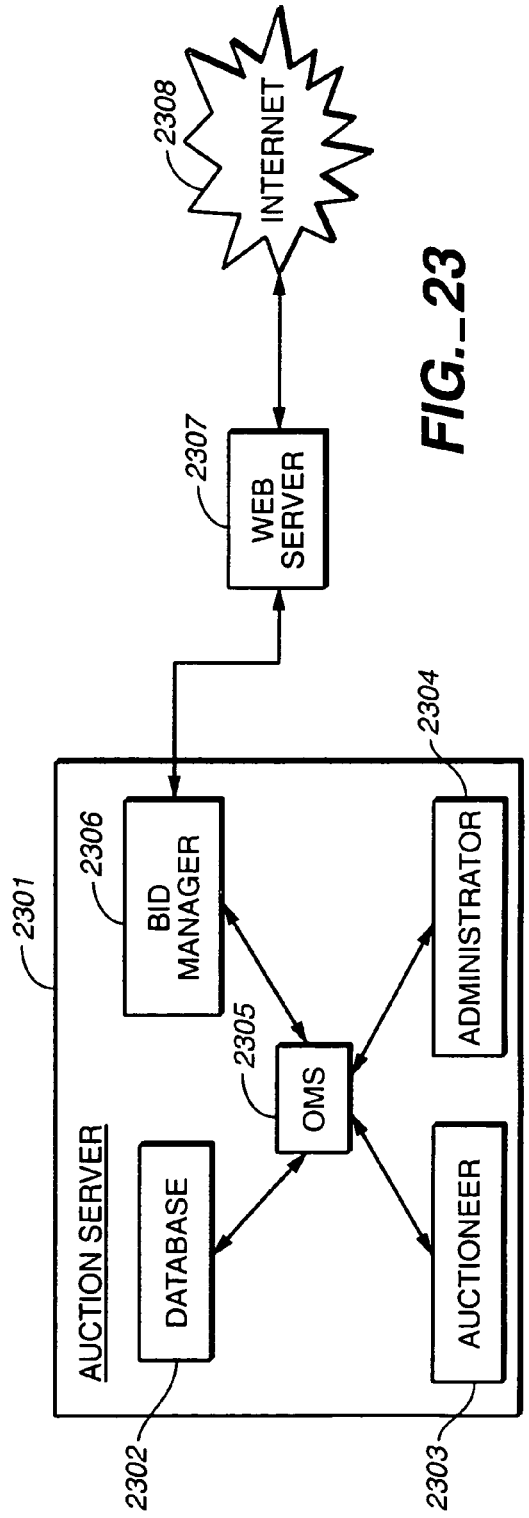
FIG._23

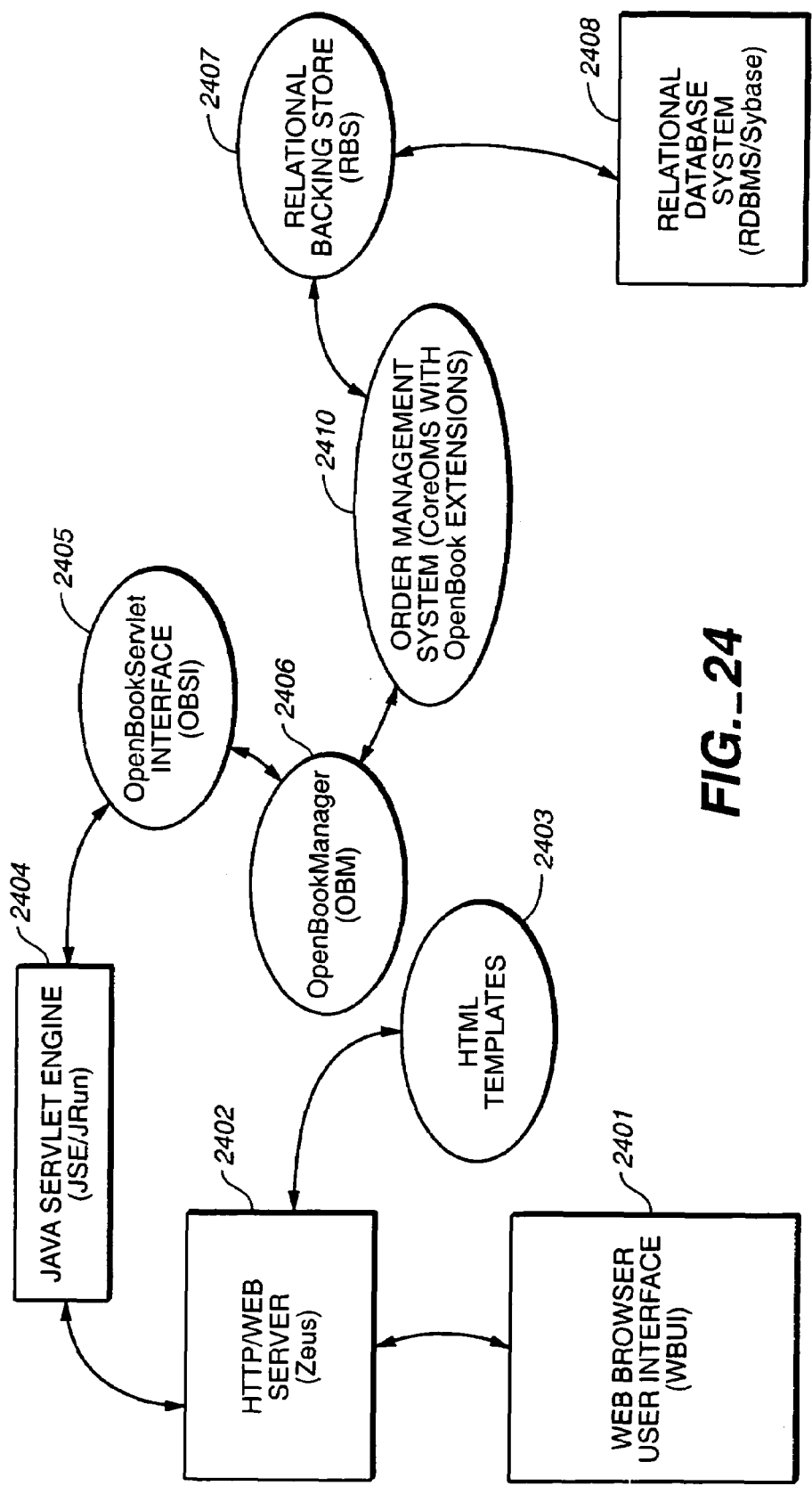
FIG._24

SYSTEM AND METHOD FOR PRICING AND ALLOCATION OF COMMODITIES OR SECURITIES

CROSS-REFERENCE TO RELATED APPLICATIONS

This application claims the benefit of U.S. Provisional Application No. 60/187,800 filed Mar. 8, 2000. This application is also related to pending application Ser. No. 09/347,949, filed Jul. 6, 1999 entitled "Auction System and Method For Pricing and Allocation During Capital Formation".

COPYRIGHT NOTICE

A portion of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to the field of Internet computer systems and processes. More specifically, the invention is a method and apparatus for pricing and allocation of commodity or security issues through use of an Internet based control system.

BACKGROUND

It is desirable that the process of buying and selling initial offerings and large regulated blocks of commodities or securities (hereinafter "securities") be made more accessible to more investors, be made more price transparent by providing more visibility into the bid and offer process, reduce the costs to issuers and investors and increase the amount of trading in these securities.

The present system of offering new issues of securities is non-transparent, inefficient and biased toward certain buyers and broker-dealers. As used herein, "securities" include equity securities, commodities (as traded on a licensed commodity exchange), fixed income or debt securities including, for example and without limitation, corporate bonds, municipal bonds, mortgage backed bonds, emerging market bonds, junk bonds, treasury bonds, convertible bonds, gold, and the like. These will be generally referred to as "securities."

While the following describes the technical problem in terms of debt securities, the general issues relate to the sale of regulated securities, commodities and other similar assets. Those skilled in these arts will recognize that the technical problem described specifically is a general one which may be solved within the letter and spirit of the invention disclosed herein.

It is typical for a municipality, corporation, or other non-U.S. treasury issuer to sell its securities by having an investment bank, or other broker, underwrite an offering. Typically, corporate bond syndications use an investment bank's salesmen to convey the terms of a pending offering to potential investors along with some preliminary, unofficial "price talk." In this way, a dialogue is initiated with investors that is intended to garner feedback concerning pricing and investor interest. This feedback is shared with the issuer and other investors.

This process is generally referred to as "book building." Book building is iterative and filtered: a sort of oral history of the "book," listing interested investors and the quantity of securities in which they are ostensibly interested, is told, retold and modified until the offering or "deal" is as big and as cheap as the issuer will tolerate. The deal is then priced by the syndicate and the issuer enters into a written agreement with the underwriter to make the offering. Thus, generally, no written commitment to actually make the offering is made by the issuer until after the offering is priced and subscribed. After the initial issue has been through this initial sale process, the securities are freed to trade in the "secondary" market, that is, the market in which securities other than new issues are traded. The issuer of the securities will typically pay fees to the underwriter for its marketing, pricing and allocation services.

In this initial sale system, market size and market price are controlled by the syndicate. And, as discussed below, the syndicate may wish to massage market size and price in order to accomplish a set of objectives which may belong to the underwriter or some subset of participants rather than the issuer and the market at large. Certain investors may be favored by an underwriter, such that other investors who express an interest in purchasing such bonds in an initial offering will have no certainty that they will be allocated any bonds by the syndicate desk. Additionally, a deal will typically become several times oversubscribed, that is, more securities will be desired by investors than are being offered by the issuer.

Potential investors are typically aware of this and, so, will indicate a quantity of securities to the syndicate which may be many times the actual amount of securities desired by the investor. Because investors understand that, in this traditional book building process, information can be filtered and massaged by the underwriter to achieve objectives that may differ from their own, investors tend to view this process with suspicion and caution. Thus, investors may attempt to manipulate the system in their favor in a number of ways. For example, as noted above, potential investors may pad their orders, indicating interest in a greater volume of securities than they truly desire. Potential investors may also stipulate that an order will fall away if the price is increased when, in fact, this simply represents posturing. The deal is then managed to the "proper" price and size by the syndicate, often to maximize fees and to please one constituent or another, but rarely to please the market as a whole or to achieve the most efficient price and distribution profile.

Because of all this attempted manipulation, the underwriter may not be able to get a good understanding of the true intentions of the potential buyers of the securities at the various potential price points. Behavior of all parties is governed by an objective to manipulate the system by using the filtering process to get the upper hand. Thus, it can be the case that, once the real market price is established in secondary trading, one constituency gains at the expense of another, leading to further mistrust of the system.

Recent conditions in the marketplace for debt securities amplify the need for a change in how these securities are bought and sold. For example, technology has become easily available to conduct electronic sales (by auctions, etc.) that promotes unfiltered price discovery on a low-cost, real-time basis. Secondly, debt investors and issuers have become financially more sophisticated in their knowledge of markets, their ability to analyze credit quality and their ability to recognize value in the market. This means that they are less dependent on financial intermediaries for research and advice than they were in the past. Third, the amount of investable funds in the market has grown dramatically over the past decade, creating intense competition for new debt issues within the investor community and creating a need for a better market clearing process. Fourth, the services provided by traditional investment banks related to the new debt issue they originate have declined significantly, while the fees charged for services rendered have remained constant. The most significant example of reduced service is the sharp decline in secondary market liquidity provided by the traditional investment banks, largely the result of a decreased appetite for the risk amidst decreased profitability in secondary corporate bond trading. Finally, the current system encourages misrepresentations about the size and quality of the book, encourages special interest deals and often creates major disputes regarding allocations which create a mistrust of the system, thereby causing investors and issuers to inflate values and amounts in a way which exacerbates the hidden nature and inaccuracies of prices in the system.

With the advent of the Internet and reasonably secure telecommunications systems, various attempts are being made to use these systems for the management of investment portfolios for mutual funds and others and for systems covering the sale and purchase of treasury bonds, corporate bonds and other securities in a way which avoids many of the described problems. Specifically in the area of bonds and other equities, for example, we have seen various patented systems. One such attempt at portfolio management is described in the well publicized U.S. Pat. No. 5,193,056 issued to Signature Financial Group on Mar. 9, 1993 titled "Data processing System for Hub and Spoke Financial Services Configuration." More specifically an attempt at automating the trading of debt securities in the secondary market is described in U.S. Pat. No. 5,809,483 issued Sep. 15, 1998 to S. William Broka et al, titled "Online Transaction processing System for Bond Trading." Another system is described in U.S. Pat. No. 5,946,667 issued Aug. 31, 1999 to Morgan Stanley Group titled "Data Processing System and Method for Financial Debt Instruments." This system is a system for investors to track the performance of certain issued debt instruments within a limited period of time and especially for implementing investor participation in domestic and foreign capital markets through positions in indexed vehicles which are packaged as debt instruments. Still another more recent example of the use of the Internet to enhance general trading is found in U.S. Pat. No. 6,023,686 issued Feb. 8, 2000 to Health Hero Network, titled "Method for Conducting an on-line Bidding Session with Bid Pooling." This system, while not aimed specifically at any specific security market, is a system for allowing individuals to pool their bids as a group in order to qualify to bid on a property in an on-line auction. That is, it allows individuals with limited funds to pool their resources with other individuals of limited resources to be able to qualify (i.e. have enough capital) to buy a piece of property that has been auctioned.

Other known internet related systems for buying and selling securities and commodities include a system set up in 1992 by Intervest, aimed at facilitating the secondary market sales of bonds between investors and broker-dealers. More recently, Brokertec, a consortium set up by Goldman Sachs and six other large institutions in the summer of 1999 is said to be trying to create an electronic inter-dealer broker for cash and futures. Tradeweb, an electronic brokerage system for U.S. Treasuries, was set up by four investment banks (CSFB (Credit Suisse First Boston), Goldman Sachs, Lehman Brothers and Soloman Brothers) in 1997 and has apparently been successful in trading these securities. These Government bonds however do not have the problems mentioned above in that they are heavily traded, their price is well known in advance and are deemed the ultimate safe investment. Still another on-line system for handling bond trading, primarily in the secondary market, is BondDesk.com owned by BondDesk.Com LLP, an internet-based provider of retail fixed income trading software, and owned by BondExchange LLC, Goldman Sachs Group Inc., Paine Webber Inc., and Spear, Leeds & Kellog. Almost all of these systems which strive to offer new issues follow the same logic; that is, they distribute research, prospectuses, filings and other new issue information over the web, which cuts down on paper, faxes and some phone calls. However the ultimate pricing and allocation of securities is still conducted via traditional methods.

There is still a need for an Internet-based centralized system which provides a low-cost, open and decentralized price discovery environment. That is, a system using current technology to improve the transparency of the price discovery process, eliminate mistrust, reduce the special interest money involved, and bring the cost of distribution more directly in line with the value added by the medium. The present invention provides a system to accomplish these goals and is applicable to the general securities and commodities transactions.

SUMMARY OF THE INVENTION

The present invention overcomes the disadvantages of the above described systems by providing an economical, high performance, adaptable system and method (designated "The OpenBook system") for conducting an auction of securities to institutional and individual investors on the Web. In the OpenBook system auction:

Bidders are rewarded for anonymously revealing their bids early.

All winners pay a single market-clearing price that sells out the securities.

All participants can monitor the auction in real time.

The OpenBook system thus creates a transparent and low-cost new issue market; offers all bidders equal access to securities; and gives both investors and issuers a "seat on the syndicate desk."

A computer implemented method for conducting an auction of securities on the web is claimed whereby Bidders are rewarded for anonymously revealing their bids early.

All winners pay a single market-clearing price that sells out the securities.

All participants can monitor the auction in real time.

An apparatus for conducting an auction of securities on the web is claimed whereby Bidders are rewarded for anonymously revealing their bids early.

All winners pay a single market-clearing price that sells out the securities.

All participants can monitor the auction in real time.

Also claimed is a network node in the Openbook system which is an auction server node in a network having a user node including a browser program coupled to the network, the user node providing requests for information and providing bidding input commands on said network, the network node comprising:

an auction server node in the Openbook system responsive to a request from the user node to participate in a securities auction as a qualified bidder, whereby the openbook system auction server node provides a bid mechanism through which bidders are rewarded for anonymously revealing their bids early, and provides an allocation of securities which allows winning bidders to pay a single market-clearing price that sells out the offered securities, and provides a system whereby all participating users can monitor the securities auction at the user node.

Also claimed is a computer program product stored on a computed useable medium, comprising;

computer readable program means for causing the computer to conduct an auction of securities on the Web;

provide a bid mechanism whereby auction bidders are rewarded for anonymously revealing their bids early;

provide an allocation of the securities which allows winning bidders to pay a single market-clearing price that sells out the securities; and provide a system whereby all participants can monitor the auction in real time.

BRIEF DESCRIPTION OF THE DRAWINGS

FIG. 1 is a flow chart illustrating a securities pricing and allocation system in accordance with a preferred embodiment of the present invention.

FIG. 2 is a flow chart illustrating processes which occur during an auction portion of the securities pricing and allocation system illustrated in FIG. 1.

FIG. 3 is a flow chart illustrating an initial bidding process which takes place during an auction portion of the securities pricing and allocation system illustrated in FIG. 1.

FIG. 4 is a flow chart illustrating a bid modification and final bidding process which takes place during an auction portion of the securities pricing and allocation system illustrated in FIG. 1.

FIG. 5 is a flow chart illustrating a bond allocation process which is part of the securities pricing and allocation system illustrated in FIG. 1.

FIG. 6 is a high level view of the internet architecture.

FIG. 7 is a screen shot of the user interface showing the log-on screen.

FIG. 8 is a screen shot of the user interface showing an exemplary set of Initial Terms for a sample offering.

FIG. 9 is a screen shot of the user interface showing an exemplary set of auction details.

FIG. 10 is a screen shot of the user interface showing an exemplary set of in-progress auction details.

FIG. 11 is an additional screen shot of the user interface showing an exemplary set of in-progress auction details.

FIG. 12 is an additional screen shot of the user interface showing an exemplary set of in-progress bids and related time-stamps.

FIG. 13 is an additional screen shot of the user interface showing an exemplary Bid confirmation set of in-progress auction details.

FIG. 14 is an additional screen shot of the user interface showing an exemplary set of current bid status data with in-progress auction details.

FIG. 15 is an additional screen shot of the user interface showing an exemplary request for confirmation of a bid modification entry with a set of in-progress auction details.

FIG. 16 is an additional screen shot of the user interface showing an exemplary warning screen indicating a time-stamp may be revised.

FIG. 17 is an additional screen shot of the user interface showing an exemplary successful purchase-auction over screen.

FIG. 18 is an additional screen shot of the user interface showing an exemplary unsuccessful purchase-auction over notice screen.

FIG. 19 is an additional screen shot of the user interface showing an exemplary details of a completed auction.

FIG. 20 is an additional screen shot of the user interface showing an exemplary error message relating to an improper bid size selection during an auction.

FIG. 21 is an additional screen shot of the user interface showing an exemplary attention message related to an attempt to cancel a bid during an auction.

FIG. 22 is a flow chart of the high level physical layout architecture of the system containing the present invention.

FIG. 23 is a flow chart showing the details of the auction server architecture of the system containing the present invention.

FIG. 24 is a flow chart showing further exemplary details of the systems architecture of the preferred embodiment of the present invention.

DETAILED DESCRIPTION OF THE INVENTION

Overview

The present invention overcomes the disadvantages of the above described systems by providing an economical, high performance, adaptable system and method (designated "the OpenBook system") for conducting an auction of securities to institutional and individual investors on the Web. In the OpenBook system auction:

Bidders are rewarded for anonymously revealing their bids early.

All winners pay a single market-clearing price that sells out the securities.

All participants can monitor the auction in real time.

The OpenBook system thus creates a transparent and low-cost new issue market; offers all bidders equal access to securities; and gives both investors and issuers a "seat on the syndicate desk."

Similarities to Traditional Investment Grade Offerings

The Openbook system auction process is similar to a traditional investment grade debt security offering in the following respects:

The offering process will occur over 3-5 days from announcement to closing

The issuer will have an effective shelf registration statement

The managing underwriters will sign a terms agreement with the issuer

Co-managers will sign an agreement among underwriters

Dealers will sign a dealer agreement

A prospectus supplement will update the base prospectus with terms of the securities issued Securities will clear regular way (T+3), DVP (delivery versus payment). Provisions are also provided for T+1 clearance in the future.

The Underwriting Agreement, Terms Agreement and Prospectus Supplement

The participants in the OpenBook system agree prior to an auction that their bids are conditional offers that the managing underwriters can accept once the auction is completed. In order to be able to immediately accept such offers, the underwriters will need to enter into a terms agreement with the issuer prior to pricing with the following provisions:

The underwriter's purchase of securities will be conditioned on a successful auction;

The auction will be bound by ranges for various terms, including the interest rate spread, issue amount and maximum Treasury rate;

The issuer, investors and underwriters will agree to abide by auction rules posted on the OpenBook system site;

The definition of prospectus will include the electronic form of the prospectus.

A system in accordance with the present invention is a system of price determination and allocation of securities that can result in substantial benefits for both companies seeking to raise capital through the sale of such securities and investors wishing to purchase such securities. As noted in the Background section, as used herein, securities includes equity securities, debt vehicles such as, without limitation, corporate or municipal bonds, mortgage backed bonds, emerging market bonds, junk bonds, commodities, gold, and money market instruments such as, without limitation, U.S. treasury bills, bank certificates of deposit, commercial paper, repurchase agreements and the like. An investment vehicle offering using a pricing and distribution system in accordance with a preferred embodiment of the present invention differs substantially from either traditional underwritten or Dutch auction security offerings. In offerings conducted in accordance with the present invention, investment vehicles will generally be sold by an offering company at a price determined by investors bidding for the vehicles using a Dutch auction type scheme. A Dutch auction is described in *Exxon Corp.*, 1977-78 Fed. Sec. L. Rep. (CCH) para. 81,198 at 88, 159 (avail. May 9, 1977) which explains:

The Dutch Auction differs in certain material respects from the practice of competitive bidding. Principally, the bids which are submitted need not cover the entire amount of the offering in order to be accepted. Each bidder, including institutions and individuals as well as registered broker-dealers, indicates the amount of the offering which is wanted, and the yield. Each bid received will, on the final date designated for entry of bids, become an irrevocable offer to purchase the amount of bonds indicated unless the bid is withdrawn.

In addition, the offering price is based upon the yields specified in the bids. After closing the invitation period, the bids are listed in ascending order of yields. The bid with the lowest yield is accepted first, and then other bids at successively higher yields are accepted up to those bids with the highest yield required to reach the total amount of the offering. The highest accepted yield is the yield at which all the bonds are awarded. Upon determination of the yield, the interest rate and price are fixed by the issuer. The securities will be awarded to the successful bidders at a uniform price based upon the accepted yield.

However, not all difficulties are alleviated using the Dutch auction method. Using either a traditional book building or a Dutch auction technique, the issuer generally does not enter into any type of binding agreement to issue the bonds until after investors have demonstrated interest or the auction has run and pricing takes place. Thus, even after expressing interest or, in a Dutch auction, placing a bid, the issuer could still decide not to issue any bonds, leaving investors uncertain that they would receive any bonds until after final pricing.

Moreover, the value of a security is an almost exclusive function of the market for the security. And, both the traditional book building method and the Dutch auction method described above provide an imperfect indication of what the actual market value of a particular fixed income security might be because of the closed nature of the process. For example, there is no quote system for the bond market to allow potential investors to gain an idea of what a new issue might be worth. Additionally, there is no mechanism for a potential purchaser to gain information about what the issuer or other potential purchasers believe the particular security is worth or the amount of securities that an issuer will offer until after a price has been set and the security has been purchased. Finally, similar deal sizes for similar grade securities may have different demand at different points in time depending on any number of outside factors. Thus, past demand for a particular type of security is not necessarily a good indicator of future demand for a similar offering. Accordingly, there is an inherent lack of certainty for investors when purchasing these types of securities using traditional methods. While a type of Dutch auction is used in the present invention, this auction is an "open" auction as opposed to a "closed" (sealed bid) type auction used by others.

In the preferred embodiment, Information concerning the offering such as a range in which the final yield will be set and a range of total offering size is preferably provided prior to the auction. Additionally, potential investors will be able to receive feedback concerning what other potential investors are bidding for the offering during the course of an auction.

Preferably, an Auction Advisor provides a system upon which the auction portion of the offering is run and assist the issuer of the securities in marketing the offering and running the auction. As shown in step 110 of FIG. 1, which is a flow chart showing an overview of a securities pricing and allocation system in accordance with a preferred embodiment of the present invention, prior to an auction, an issuer communicates a mandate to the auction advisor that the issuer wishes to conduct a bond offering using a pricing and allocation system in accordance with the present invention. Then, as shown in step 112, the issuer enters into an agreement with the auction advisor to price and sell the issuer's offering. Preferably, this agreement is legally binding on the issuer contingent only on completion of a successful auction.

Because a binding agreement has been entered into, as shown in step 113, the issuer and/or auction advisor are able to determine a number of auction parameters, discussed in detail below, preferably including parameters which limit the price and total size of the offering. These auction parameters are preferably publicized to potential auction participants.

In a securities distribution system in accordance with the present invention, bidder's can preferably place two types of bids, a competitive bid and a non-competitive bid. As explained below in detail, bids include both a price component and a quantity component. Non-competitive bids are given in terms of the dollar amount of securities desired by the bidder and are automatically assigned a price component equal to a minimum yield for the offering as set by the auction parameters. Competitive bids preferably have both a quantity component and a price component chosen by the bidder which may be above a minimum yield as set by the auction parameters. Additionally, competitive bids preferably have a private component, used for pricing and allocation, and a public component, which is preferably made available to other bidders while an auction is in progress and which is preferably related to the private component. By having a public and private component, competitive bids can be used to provide bidders and issuers with information about the market value of an offering without requiring the bidder to reveal exactly what his or her bid is. Finally, as shown in step 116, the auction is closed and, as explained below, preferably 30 minutes after the close of the auction final pricing is completed.

Next, as shown in step 118, a pricing and allocation auction is conducted by the auction advisor. Basically, a clearing price is determined by arranging bids received during the auction in order from best to worst and pricing the offering at the bid price at which all the bonds offered can be allocated. Bonds are then allocated to all bidders bidding inclusively between the best bid price and the clearing price. Preferably, pricing achieved at this stage is set relative to the yield of a benchmark Treasury bond at a time after the auction has ended.

A securities distribution system in accordance with the present invention provides a number of significant advantages over a traditional fixed income securities offering. First, because issuers preferably enter into an agreement to sell bonds before pricing or allocation of bonds occurs, investors are provided with a relatively higher degree of certainty that bonds will be issued.

Also, far more information can, and preferably is, made available to investors prior to a showing of interest by investors than in past securities distribution systems. Pricing and deal size information is made available via the auction parameters publicized prior to the auction. Additionally, further "real-time" pricing information is made available to potential investors during an auction by publicizing the public component of all bids as they become available. Both of these features of a preferred embodiment of the present invention advantageously disseminate important information to investors allowing investment decisions based on a higher degree of certainty.

The auction system also can provide greater exposure to the retail market as individual investors preferably have the ability to bid on offerings on substantially equal footing with institutional investors. Thus, individual retail investors can gain access to new fixed income offerings, including high-grade corporate bond offerings, whereas they may not have had such access under previous security distribution schemes. The ability for retail investors to bid along side institutional investors may have the additional effect of increasing demand over that of a typical underwritten offering where the retail market is largely ignored relative to institutional buyers.

Additionally, the issuer of the securities does not have to pay as much of a premium to an investment bank or other broker for selling the securities because of the inherent efficiencies of the electronic system. This can advantageously result in substantial savings to the issuer in making a security offering.

The auction system provides greater certainty that the allocation of securities are awarded to those that desire them the most. Allocation is based on the aggressiveness of an investor's bid and their time stamp. The higher the price an investor is willing to pay for a security and the earlier they place their bid, the more likely they are to be awarded securities.

In a preferred embodiment, offerings utilizing an auction in accordance with the present invention will be conducted through the use of a software system developed by the assignee, W. R. Hambrecht, Inc., which is described in more detail below. This system will handle multiple aspects of the offering process, including subscription, pricing and allocation. It is to be understood, however, that a securities pricing and allocation system in accordance with the present invention my be achieved by any number of similar web-based software and hardware modules.

Although, as noted above, the pricing and distribution system of the present invention can be applied to any type of security, a preferred embodiment, discussed below, will be described with respect to bonds or, more specifically, corporate bonds. Additionally, pricing for bonds herein will be referred to in terms of interest rate paid on the bond or yield. Specifically, pricing will be referred to with respect to the interest rate paid on the auctioned bonds relative to the interest rate paid on a selected benchmark treasury bond. This quantity will be referred to herein as the "spread." It is to be noted that the lower the spread, the lower the interest rate the issuer must pay on the bond. Consequentially, the lower the spread of a given bid, the more attractive it is to the issuer.

Subscription

In a system in accordance with the present invention, investment vehicle offerings are preferably accessible to both institutional and retail investors. In order to participate in any given offering investors must be registered with a designated Underwriter. It is expected that institutional investors will be able to register directly with such Underwriter, but that retail investors will typically participate via on-line brokerage firms. On the day the bonds become available for sale by the issuing company registered investors can submit bids on the offering. Preferably, bids are submitted electronically through a web-based interface maintained by the Assignee, W. R. Hambrecht Inc., as the Auction Advisor. As discussed in detail below, any investor making a bid will indicate the number of bonds such investor would be willing to purchase ("Bid Quantity") and the spread the investor would be willing to accept ("Spread").

Set-Up

Preferably, to arrange an offering, an issuer of securities contacts the auction advisor at least a week prior to the date the issuer would like to sell the bonds and arranges to have the auction advisor offer and sell the bond issue through the auction process of the present invention.

Prior to conducting an auction, an issuer and/or the auction advisor determine a number of auction parameters, listed below. Then, preferably, these parameters are announced to potential bidders prior to the start of the auction. This feature advantageously provides a potential investor with far more information about a bond offering than was traditionally available through the previously used bond sales techniques discussed in the Background section.

The parameters listed below are those which are determined in a preferred embodiment. It is to be understood that it is within the ambit of the present invention to include either greater or fewer auction parameters to be decided prior to the auction and announced to potential bidders.

1. A minimum and maximum dollar amount of bonds to be issued ("the Minimum and Maximum deal size"). This provides a potential investor with concrete information concerning the total size of an offering prior to bidding. The precise dollar amount of bonds to be issued is preferably set midway between the start and finish of an auction (which preferably would have a duration of from 1 to 4 hours) and will be between the Minimum and Maximum deal size. As discussed in detail below, by the midpoint of an auction a substantial amount of pricing and demand information will preferably have been collected by the auction advisor and disseminated to both the issuer and the bidders. Thus, the issuer is advantageously provided with valuable pricing and demand information which can be used in determining a final dollar amount of the offering.

2. A reference Treasury security of comparable maturity to bonds being issued (the "Benchmark Treasury"). Bids are expressed in terms of a yield above the yield of the Benchmark Treasury, or the spread. As discussed below, the auction process determines a spread at which the offered bonds will be sold (the "clearing spread"). The final yield, however, is based on the yield of the Benchmark Treasury, which can continue to fluctuate after a clearing spread has been determined. The final yield is preferably set based on the yield of the Benchmark Treasury 30 minutes after the close of the auction.

3. A minimum and a maximum differential over the Benchmark Treasury for which bids will be accepted (the "Minimum Spread" and the "Maximum Spread," respectively). Providing this information prior to the beginning of an auction gives potential investors an idea of the range for the final yield of the offered bonds (depending on the yield of the Benchmark Treasury 30 minutes after the close of the auction). Thus, potential investors can gauge their interest in an offering and size and price their bids accordingly.

4. A maximum yield for the Benchmark Treasury (the "Maximum Benchmark Treasury Rate"). This indicates a maximum yield of the Benchmark Treasury. The issuer and/or the auction sponsor has the right, but not the obligation, to cancel an auction if the actual treasury rate is greater than the Maximum Benchmark Treasury Rate.

5. A minimum dollar size for competitive bids and non-competitive bids. This is the lowest dollar amount a bidder can bid in either a competitive bid or a non-competitive bid. These parameters are set to prevent a proliferation of undersized bids which could add unnecessary administrative complexity to an auction. Additionally, an individual investor may use these parameters to determine whether he or she wishes to participate in the auction at all. The minimum dollar size for competitive bids may, but need not, equal the minimum dollar size for non-competitive bids.

6. A minimum dollar increment for competitive bids and non-competitive bids. Bids must be made in these predetermined increments. For example, if the minimum dollar increment is $1000.00, bids must be in this increment. That is, no bids of, for example, $10,500 would be accepted. These parameters are set to mitigate administrative difficulties. The minimum dollar increment for competitive bids may be, but does not need to be, the same as the minimum dollar increment for non-competitive bids.

7. A maximum dollar bid quantity (the "Maximum Bid Size"). This is the maximum dollar amount that any single bidder can bid after combining the bidder's competitive bid and non-competitive bid. This parameter is set to prevent any single bidder from having a dominating influence on the spread set by the auction. Setting this parameter, then, can allow the clearing spread to better reflect a true market valuation of the offered bonds.

8. A maximum spread under an Initial Bid that potential investors can modify a Final Bid without canceling their competitive bid ("the Protected Spread Range"). As discussed in greater detail below, a competitive bid has a public spread component and a private spread component. The Protected Spread Range is the maximum amount, expressed in terms of basis points, which the private spread component can be below the public spread component without requiring cancellation and re-entry of the entire competitive bid. For example, if a Protected Spread Range is set at 0.04 (expressed in basis points) and a potential investors competitive initial (public) bid is 0.75, then the final (private) bid cannot be below 0.71 without canceling and re-entering the competitive bid. As discussed below, the protected spread range tends to cause the pricing information provided publicly during an auction to reflect the private bid information upon which the final pricing of the offering will be based.

9. A maturity date for the issue.
10. A coupon frequency for the issue.
11. An auction starting and ending time. As noted above, auction duration is preferably between 1 and 4 hours.
12. A time when the final deal size will be announced. As discussed above, this time is preferably during the progress of an auction.

By publicizing the auction parameters listed above prior to the start of an auction, potential investors can receive far more information about a fixed income offering than was typically made available in past offering techniques. In particular, through publication of the Minimum and Maximum Deal Size, the Benchmark Treasury and the Minimum and Maximum Spread, potential investors will receive information about both the size and pricing of a bond offering prior to the sale of the bonds. This information can advantageously be used by investors to make relatively more certain investment decisions.

Auction Process

FIG. 2 is a flow chart illustrating a preferred embodiment of the major processes which take place during the auction portion of a system in accordance with the present invention. As shown in step 150, the auction begins at a predetermined and published time. During the auction, there are three major processes which take place. As shown in step 152, the auction advisor monitors the progress of the auction. In a preferred embodiment, this includes, for example, activities such as allowing only one competitive bid and one non-competitive bid per auction participant, monitoring the Benchmark Treasury Rate to see if it exceeds the Maximum Treasury Rate, and policing the authenticity of placed bids.

Additionally, as shown in step 154, and as explained in detail below, bids are taken by the auction advisor and the public component of the bids are publicized. It is to be understood that preferably, bids taken during an auction are not necessarily accepted. That is, simply because the auction advisor takes a bid from a bidder, it does not necessarily mean that the bidder will receive bonds. As discussed below, only successful bidders will receive bonds.

As shown in step 156, the deal size is set, preferably midway through the auction. At a predetermined ending time, as shown in step 158, the auction is ended and no more bids are taken.

Bidding

Preferably, a pricing and allocation system in accordance with the present invention determines the yield which the bonds being offered will generate based on bids received by potential investors. A potential investor's auction bid preferably indicates two things: the number of bonds the potential investor wishes to purchase and the yield the potential investor wishes to receive for the bonds. The number of bonds is preferably expressed as the total value of the bonds the potential investor wishes to buy, for example, an investor might indicate a desire to purchase $200,000 worth of bonds. The yield the potential investor would like to receive on the purchased bonds is preferably indicated in terms of spread between the yield of the Benchmark Treasury at the time of final pricing and the desired yield of bonds being bid for in one basis point increments. For example, if the Benchmark Treasury has a yield of 7%, the auction participant would bid 1.5% to indicate a willingness to accept an 8.5% yield on the purchased bonds.

As discussed in detail below, in an bond pricing and distribution method in accordance with a preferred embodiment of the present invention, whether a bid is successful depends generally on two factors: the size of the bid spread and the relative time at which the bid was placed. Generally, the lower the bid spread and the relatively earlier the bid is placed, the more likely the auction participant will receive the full amount of bonds desired. Preferably, in order to determine when a bid was placed, a "time stamp" is associated with the bid which indicates when a bid was received relative to other bids received during an auction.

As mentioned above, in a preferred embodiment of the present invention, there are two general categories of bids which an auction participant can place: competitive bids and non-competitive bids. Competitive bids preferably indicate both a quantity and a spread which can be above the Minimum Spread set by the issuer prior to the auction. Non-competitive bids, on the other hand, simply express a total amount of bonds which the bidder desires at whatever the clearing price will be.

Additionally, there are two categories of competitive bids: public competitive bids and private competitive bids. When first entering a competitive a bid, a bidder preferably enters both a public competitive bid, or "initial bid," and a private competitive bid, or "final bid." The initial bid will not be part of a firm offer from the potential investor at the time of the auction close, however, the final bid will be part of such a firm offer. Additionally, the spread and quantity of the initial bid is made available to other potential investors while the auction is taking place (though the identity of the bidder is preferably not revealed). Preferably, if the bidder does not enter a final bid at the time of entering the initial bid, the initial bid becomes the final bid by default.

Because the final bids affect the clearing spread of the offering, and become the potential investor's firm offer at the time of the close of the auction, in order to provide an indication to auction participants of the market value of the offering, it might be desirable to publicize the final bids. However, it may also be desirable to auction participants to keep precise information about their firm offers private until the end of the auction. Accordingly, to provide all bidders with some indication of the market value of the offering, the private, final bids are preferably related to the public, initial bids.

To achieve this, in a preferred embodiment, the issuer sets a Protected Spread Range which indicates the maximum amount a bidder's final bid can be below his or her initial bid from the final bid spread without altering the time stamp of the bid. For example, if an issuer set a protected spread range of 0.35 basis points, a bidder's final bid spread could not be more that 0.35 below the bidders initial bid without losing the time stamp of the bid. Preferably, if the bidder goes out of the protected spread range, the original time stamp for the bid is lost and a new time stamp corresponding to the time the final bid outside the protected spread range was made is assigned to the new bid. Additionally, a new initial bid is preferably created by default to match the final bid which is outside the protected spread range of the original initial bid. Preferably, the final bid is not allowed to be above the initial indication. This provides bidders viewing publicly provided bid information with the knowledge that the information provided reflects the largest spreads that other bidders are bidding. This can provide greater certainty for bidders viewing publicly provided bid information.

As noted above and explained in detail below, bonds are preferably allocated partially based on the time stamp corresponding to the bid. Thus, in a competitive auction, it is to a bidder's benefit to both bid early and retain the time stamp of his or her bid by not placing a final bid outside the protected spread range. This provides a motivation for bidders to make final bids which are inside the protected spread range with respect to the bidder's initial bid. This, in turn, provides a motivation for bidders to make their initial bids reflect the bidder's genuine beliefs about the market value of the offering. Thus, advantageously, there is impetus to make publicly provided bid information available relatively early in the auction process and bear some relationship to the true market value of the bond offering.

As mentioned above, bidders can also place non-competitive bids instead of or in addition to competitive bids. In a Non-competitive bids the bidder enters a bid for the amount of bonds desired, such as $200,000. For pricing purposes, the spread component is set at the Minimum Spread as determined by the issuer prior to the auction. As will be explained in detail below, this means that non-competitive bids are the first bids "filled" or allocated the requested quantity of bonds. In this way, a bidder who wants a certain amount of the offered bonds, but is not highly concerned about the yield, can simply indicate how many bonds he or she desires and the bid will likely be filled at clearing spread. Also, preferably, retail investors are limited to submitting only non-competitive bids while institutional investors can submit either competitive or non-competitive bids. This advantageously allows savvy, institutional investors to retain substantial control over the final price of the bonds thereby reducing the possible irrationality which may be introduced into the market if retail investors were substantially impacting the price of bonds. Like competitive bids, non-competitive bids also receive a time stamp when placed which may be used to determine allocation priority.

FIG. 3 is a flow chart illustrating a preferred embodiment for placing an initial bid in accordance with the present invention. At step 200, an investor places an initial bid. As shown in steps 210 and 216, the investor will have to enter quantity and, if the bid is competitive, will also have to enter a spread. After entering a quantity in step 210, as shown in steps 212 and 214, two checks are performed by the system. First, in step 212, it is determined whether the bid quantity is greater than the minimum bid size and in the correct bid increment. If either one or both of these conditions is not met, the investor is returned to step 210 and asked to enter another bid quantity. If both of these conditions are met then, in step 214, the system checks to be sure that the entered quantity is less than or equal to the investor's credit limit or the maximum bid size. If the entered quantity is not less than or equal to either one or both of these parameters than the invest or is asked to reenter the bid quantity. If the quantity is less than or equal to the investors credit limit and the maximum bid size, then the quantity component of the bidder's initial bid is approved.

As shown in step 216 a spread is also associated with the initial bid. In step 218, the system first determines whether the bid is competitive or not. If the bid is not competitive then, in step 222 the spread for the bid is set equal to the minimum bid spread. If the initial bid is part of a competitive bid then a shown in step 220, it is determined whether the spread is below the maximum spread and above the minimum spread. If the spread is outside this minimal/maximum spread range, the bidder is returned to step 216 and asked to enter another spread. If the spread is within the minimum/maximum spread range, then the spread component of the bid is approved. Finally in step 224, if both the quantity component and the spread component of the initial bid are approved, the bid is displayed to the public and given a time stamp.

As discussed above, it is possible to modify the spread component of a competitive bid. Additionally, it is possible to modify the quantity component of either a competitive bid or a non-competitive bid. FIG. 4 is a flowchart illustrating how a system in accordance with the present invention allows a bidder to modify the quantity component of either a competitive bid or a non-competitive bid and enter and modify a final bid (of a competitive bid). At step 300, an investor modifies the quantity component of either competitive bid or noncompetitive bid. At step 310, the system checks whether the modification is greater than the minimum bid size and in the correct bid increment. If the modified bid violates either parameter, then the bidder is returned to step 300 and asked to enter a new modification. If both parameters are satisfied, then, in step 312, the system checks whether the modified bid quantity component is greater or equal to the current bid quantity component. Thus, if the new quantity component is less than the original quantity component, as shown in step 316, the bidder is asked whether he or she would like to place a new bid, that is, a bid having a new time stamp.

If the bidder does not wish to lose the time stamp of the original bid, he or she is returned to step 300 to make an appropriate bid modification. If the bidder does wish to enter a new bid he may do so but only up to the pegged amount.

Changing a bid quantity by a relatively large amount, e.g. more than 50%, can have a relatively large effect on the bid information that is provided to bidders during the auction. Thus, allowing such large changes is bid quantity could introduce greater uncertainty into the auction process. Accordingly, bidders are preferably discouraged from changing their bid quantities by such a large amount. Preferably, if a bidder changes his or her original bid quantity by 50% or more, the original bid is cancelled and the bidder must enter a new bid with a new time stamp. Therefore, if the new quantity component of the modified bid is greater than or equal to the current bid quantity component then, at step 314, the system checks whether the new quantity is less than 50% more than the original quantity component. If so, then, at step 316, the bidder is asked whether he or she would like to enter a new bid. However, if the new quantity component is less than 50% more than the original quantity component, the change is accepted, the time stamp is preserved and, as shown in step 318, the new quantity component is displayed to other bidders.

As discussed above, a competitive bid also has a final bid component which is not made public during the auction. Referring again to FIG. 4, at step 400, a bidder enters or modifies the final bid component of a competitive bid. As shown at step 400, the final bid component of a competitive bid is set to the initial bid component by default. However, a bidder preferably is able enter a final bid which is different from the initial bid if the final bid is less than the initial bid and within the Protected Spread Range from the initial bid. Accordingly, as shown at step 410 the system checks whether the entered final bid is less than the initial bid by no more than the Protected Spread Range. If it is not, at step 420, the bidder is given the opportunity to enter a new bid.

If the bidder does not wish to enter a new bid, the bidder is returned to step 400. If the bidder does wish to enter a new bid, as shown in step 414, a new time stamp is assigned to the modified bid and the initial bid component of the modified bid is by default set equal to the new final bid component. If the bidder desires, however, an initial bid different from the new final bid can be entered as long as it is greater than the new final bid and within the protected spread range of the final bid. Returning to step 410, if the new final bid entered at 400 is less than the original initial bid by no more than the Protected Spread Range, then at step 416, the new final bid is accepted with no change in the time stamp of the bid.

After accepting bids for a predetermined amount of time, as set in the auction parameters, the auction is closed and no additional bids are accepted and submitted bids cannot be changed.

Pricing and Allocation

The final yield which investors will receive for bonds sold through the auction process is preferably determined following the auction close. Most preferably, the final yield is determined 30 minutes after the auction close. Immediately after auction close, however, a spread at which the offered bonds will be sold relative to the Benchmark Treasury Rate, or clearing spread, is determined. FIG. 5 is a flow chart showing the process which is used to price and allocate bonds in the offering.

As shown at step 500, non-competitive bids and final bid components of competitive bids are arranged in an array from lowest spread to highest spread. As noted above, non-competitive bids are automatically assigned the Minimum Spread as determined in the auction parameters. Accordingly, non-competitive bids will be collected at the lowest level of the array of arranged bids. Bids having the same spread are arranged in the array in ascending order from the earliest time stamp to the latest time stamp. Bids having the same time stamp and spread are placed at the same level in the array.

As shown in steps 501 and 510, the lowest bid or bids (if multiple bids share the same time stamp) are "accepted." Subject to there being sufficient quantity demand to fill the deal size, bidders of accepted bids will receive bonds at the clearing spread. Then, in step 512, the system checks whether the aggregate quantity of accepted bids equals or exceeds the deal size. If not 511, then the next highest bid or bids in the array are accepted. The system loops through steps 510 and 512 until the aggregate quantity of accepted bids is equal to or greater than the deal size 513. Then, as shown in step 514, the system checks whether all of the accepted bids are non-competitive bids. If not 515, that is, if there is at least one competitive bid accepted, then as shown in step 516, the clearing spread is set equal to the spread of the last accepted bid or bids (having the same spread and time stamp).

If all of the accepted bids are non-competitive 517 then, as shown in step 518, the clearing spread is set at either one of two values. If the aggregate dollar quantity of bonds requested by the accepted bids exactly equals the deal size, bonds will be awarded at the mid-point between the Minimum Spread and the Maximum Spread. If, however, the aggregate quantity of bonds requested by the accepted bids is greater than the deal size, bonds will be awarded at the Minimum Spread.

As shown in step 520, if there are multiple bids with the same time stamp and which spread component equals the clearing spread, then bonds are allocated among these bids on a pro-rate basis. Then, in step 522, the system determines whether the aggregate quantity component of the accepted bids is greater than the deal size. If it is not 523, that is, if the aggregate quantity component of the accepted bids is equal to the deal size, then, as shown in steps 524 and 526, investors are awarded bonds at the clearing spread according to the quantity component bid.

As shown in step 528, if the aggregate quantity component of the accepted bids is greater than the deal size, the accepted bids with the highest spread and the latest time stamp will be awarded only a portion of desired quantity indicated by the bid. The portion awarded is preferably equal to the difference between the deal size and the aggregate quantity of bonds requested by all accepted bids minus the quantity of bonds requested by the accepted bid with the highest bid and the latest time stamp. Additionally, as shown in step 526, bonds will be awarded at the clearing spread.

Closing

Bond pricing occurs approximately 30 minutes after an auction terminates.

The auction yield is preferably determined by adding the clearing spread to the Benchmark Treasury Rate. The coupon rate on the bond will be set at the auction yield rounded down to an increment determined by the issuer and auction advisor. The bond price that corresponds to the auction yield and coupon rate is preferably rounded to three decimal places.

BEST MODE FOR CARRYING OUT THE INVENTION

While the following description of the preferred embodiment articulates the current operating rules in terms of an auction and system focused on bond or debt securities it will be clear to those skilled in these arts that these and similar rules can be used in and for similar electronic auctions of securities of any kinds as well as for similar auctions of most commodities. Similarly, while the description of the systems hardware and software and their current architecture are used at present for auctions of bonds and other debt securities, it will be clear to those skilled in these arts that these and similar hardware and software means can be used in and for similar electronic auctions of securities of any kinds as well as for similar auctions of most commodities.

Technology Employed

The OpenBook auction system builds on the design and architecture developed for W. R. Hambrecht's proprietary OpenIPO™ equity underwriting platform. This is described in the related pending application Ser. No. 09/347,949 filed Jul. 6, 1999 which is incorporated fully herein by reference. The auction engine employs a modular, client-server architecture that can be partitioned across several processors using standard network protocols. The core of the system is the Order Management Server (OMS) which utilizes a commercial, off-the-shelf relational database to provide transaction-oriented persistent storage. Other components of the system interact with the OMS via a distributed messaging system to handle administration, bid management, and securities allocation. The novelty of the present invention including its differences from this prior invention will be described in more detail below.

Current Operating Rules

In the preferred embodiment of the system, the following rules govern the participation of buyers and sellers of securities and are consistent with current Federal and State Regulations governing the sale of such securities.

1. General Terms
   1.1. These rules (the "Rules") shall govern the participation by prospective purchasers of securities (the "Investor(s)") in the OpenBook system Internet electronic auction system (the "System" or "the OpenBook system") operated by W R Hambrecht+Co. ("WRH"). Each Investor by signing a Customer Agreement and/or Participation Agreement with WRH, an underwriter or dealer participating in the OpenBook system agrees to be bound by the Rules and to consent to the participation of other Investors in the OpenBook system. These rules should not be interpreted in connection with any other document (including documents posted on the WRH web site) except the Customer Agreement, The OpenBook System Participation Agreement and any amendments to this document specifically labeled as such.
   1.2. WRH has the exclusive right to amend the Rules from time to time and will post such amendments on the OpenBook system. Investors will be bound by an amendment after the effective date set forth in the amendment.
   1.3. WRH has the right to cancel any auction if in its sole discretion events have occurred that would interfere with the operation of such auction.

2. The Issuer
   2.1. An issuer of securities ("the Issuer") and/or WRH selects the following terms that will be announced on the OpenBook system prior to an auction: a minimum and maximum dollar amount of bonds to be issued; a reference Treasury security of approximately comparable maturity to bonds being issued (the "Benchmark Treasury"); a minimum differential (a "Spread") over the Benchmark Treasury for which bids will be accepted (the "Minimum Spread over the Benchmark Treasury"); a maximum differential over the Benchmark Treasury for which bids will be accepted (the "Maximum Spread over the Benchmark Treasury"); a maximum rate for the Benchmark Treasury (a "Maximum Benchmark Treasury Rate"); a minimum dollar size for Competitive Bids (the "Minimum Competitive Bid Size"); a minimum dollar increment for Competitive Bids (the "Minimum Competitive Bid Increment"); a minimum dollar size for Non-Competitive Bids (a "Minimum Non-Competitive Bid Size"); a minimum dollar increment for Non-Competitive Bids (the "Minimum Non-Competitive Bid Increment"); a maximum dollar bid quantity (the "Maximum Bid Size"); a maximum Spread under an Initial Bid that Investors can modify a Final Bid without canceling their Competitive Bid (the "Protected Spread Range"); a maturity date for the issue; a coupon frequency for the issue; an auction starting time; an auction ending time; and a time that the Deal Size will be announced. An Issuer and/or WRH may select any additional terms deemed relevant to an auction.
   2.2. The Issuer and/or WRH has the right, but not the obligation to cancel an auction on the OpenBook system if the actual treasury rate is greater that the Maximum Benchmark Treasury Rate.
   2.3. The Issuer and/or WRH will announce the exact dollar size of an issue (the "Deal Size") at some pre-specified point during an auction.

3. Bidding
   3.1. The auction will start and end at times determined by the Issuer and/or WRH. Investors may not place bids prior to the start or after the end of the auction.
   3.2. Investors may enter a desired quantity of bonds in dollars and two Spreads over the Benchmark Treasury, in one basis point increments (collectively a "Competitive Bid").
      3.2.1. When an Investor enters a Competitive Bid, the first Spread component will be revealed to other Investors on the OpenBook system, but the identity of the Investor will remain anonymous (an "Initial Bid").
      3.2.2. The second Spread component will not be revealed to other Investors until after the auction ends (the "Final Bid"). The Final Bid may not be less than the Initial Bid by more than the Protected Spread Range.
      3.2.3. The Initial Bid will not be part of a firm offer on the part of the Investor at the time of the auction close. The Final Bid and quantity component of a Competitive Bid will comprise a firm offer on the part of the Investor at the time of the auction close.
   3.3. In addition to or in place of a Competitive Bid, Investors may enter a desired quantity of bonds in dollars and a Spread equal to the Minimum Spread over the Benchmark Treasury (collectively a "Non-Competitive Bid").
   3.4. New Competitive Bids and new Non-Competitive Bids will be marked in one minute increments at the time a confirmation of a bid is received by the OpenBook system (the "Time Stamp").

3.5. Investors may place only one Competitive Bid and one Non-Competitive Bid at any time.

3.6. The quantity component of a Competitive Bid must be greater than or equal to the Minimum Competitive Bid Size and in an increment evenly divisible by the Minimum Competitive Bid Increment. The quantity component of a Non-Competitive Bid must be greater than or equal to the Minimum Non-Competitive Bid Size and in an increment evenly divisible by the Minimum Non-Competitive Bid Increment.

3.7. When added together, the quantity components of a Competitive Bid and a Non-Competitive Bid must not exceed the lesser of an Investor's credit limit as set by WRH or the Maximum Bid Size.

3.8. An Initial Bid and a Final Bid must be greater than or equal to the Minimum Spread over the Benchmark Treasury and less than or equal to the Maximum Spread over the Benchmark Treasury.

4. Changing Bid Spreads 4.1. Investors may change a Final Bid at any time during the auction. A Final Bid must be less than or equal to the current Initial Bid.

4.2. If an investor attempts to change a Final Bid to a value that is less than the Initial Bid by more than the Protected Spread Range (a "Disqualified Final Bid"), the OpenBook system will automatically offer the Investor the opportunity to enter a new Competitive Bid with the following values set by default but subject to change by the Investor: a quantity component equal to the quantity component of the previous Competitive Bid and an Initial Bid and Final Bid equal to the Disqualified Final Bid.

4.3. Investors cannot modify the Spread component of a Non-Competitive bid.

5. Changing Bid Quantities 5.1. Investors may change the quantity component of a Competitive Bid or Non-Competitive Bid at any time during an auction.

5.2. If an Investor attempts to change the quantity component of a Competitive Bid to a value (the "Competitive Bid Disqualified Quantity Component") that is (1) less than the currently existing quantity component of that Competitive Bid or (2) that is greater than 50% more than the first quantity component that an Investor entered for that Competitive Bid, the OpenBook system will automatically offer the Investor the opportunity to enter a new Competitive Bid with the following values set by default but subject to change by the Investor: a quantity component equal to the Competitive Bid Disqualified Quantity Component and an Initial Bid and Final Bid equal to the Initial Bid and Final Bid components of the previous Competitive Bid.

5.3. If an Investor attempts to change the quantity component of a Non-Competitive Bid to a value (the "Non-Competitive Bid Disqualified Quantity Component") that is (1) less than the currently existing quantity component of that Non-Competitive Bid or (2) that is greater than 50% more than the first quantity component that an Investor entered for that Non-Competitive Bid, the OpenBook system will automatically offer the Investor the opportunity to enter a new Non-Competitive Bid with the following values set by default but subject to change by the Investor: a quantity component equal to the Non-Competitive Bid Disqualified Bid Quantity Component and a Spread component equal to the Minimum Spread over the Benchmark Treasury.

6. Award of Bonds 6.1. If the total quantity of bonds requested by all Competitive and Non-Competitive bids is less than the Deal Size, WRH has the right, but not the obligation to cancel the auction and reject all submitted bids. If the total quantity of bonds requested by all Competitive and Non-Competitive bids is less than the Deal Size and WRH decides not to cancel the auction, the underwriting syndicate will place a Non-Competitive Bid with a quantity component equal to the difference between the Deal Size and the total quantity of bonds requested by all Competitive and Non-Competitive bids.

6.2. At the end of an auction, Competitive and Non-Competitive Bids will be arranged from the lowest to the highest Final Bid or Spread component of a Non-Competitive Bid. Except as modified by Sections 6.3-6.5, Competitive Bids and Non-Competitive Bids will be accepted starting with the lowest Final Bid or the lowest Spread component of a Non-Competitive Bid until the aggregate quantity of bonds requested by the accepted bids is greater than or equal to the Deal Size. The lowest Spread level that results in the total quantity of bonds requested being greater than or equal to the Deal Size is called the "Clearing Spread".

6.3. All Competitive Bids that have a Final Bid component or Non-Competitive Bids that have a Spread component that equals the Clearing Spread will be arranged from earliest to latest Time Stamp. Except as modified by Sections 6.4 and 6.5, Competitive Bids and Non-Competitive Bids will be accepted starting with the earliest Time Stamp until the aggregate quantity of bonds requested by the accepted bids is greater than or equal to the Deal Size. Bids that have the same Time Stamp and that have a Spread component equal to the Clearing Spread will be awarded bonds on a pro-rata basis according to dollar quantity of bonds requested.

6.4. If all bids are Non-Competitive and the aggregate dollar quantity of bonds requested by those bids exactly equals the Deal Size, bonds will be awarded at the midpoint between the Minimum Spread over the Benchmark Treasury and Maximum Spread over the Benchmark Treasury. Except as modified by Section 6.5, if all bids are Non-Competitive and the aggregate dollar quantity of bonds requested by those bids is greater than the Deal Size, bonds will be awarded at the Minimum Spread over the Benchmark Treasury.

6.5. If the aggregate quantity of bonds requested by all accepted bids is greater than the Deal Size, the accepted bids with the highest Spread and the latest Time Stamp will be awarded a partial quantity of bonds equal to the difference between the Deal Size and the aggregate quantity of bonds requested by all accepted bids minus the quantity of bonds requested by the accepted bid with the highest Spread and the latest Time Stamp.

6.6. All Investors that have a Final Bid or Spread component of a Non-Competitive Bid less than the Clearing Spread will be awarded bonds at the Clearing Spread.

6.7. W. R. Hambrecht reserves the right to reject a Competitive or Non-Competitive bid for any reason.

6.8. A bid that is accepted by WRH will constitute an irrevocable contract to purchase securities by the Investor.

7. Pricing 7.1. Bond pricing occurs approximately 30 minutes after an auction terminates. The auction yield (the "Auction Yield") is determined by adding the Clearing Spread to the Benchmark Treasury Rate. The coupon rate on the bond will be set at the Auction Yield rounded down to an increment determined by WRH and the Issuer. The bond price that corresponds to the Auction Yield and coupon rate is rounded to three decimal places.

The Auction Process

In an embodiment of the invention, an overview of the system of the present invention is shown in FIG. 6. In an embodiment of the invention, an end user of the auction method and system of the present invention uses a standard web browser 601 to access via a network, such as the Internet 602, both an information website 603 and the auction server 604. The information website 603 may be associated to a published URL and contains information about offerings and the auction process of the method and system of the present invention. The auction server 604 may contain the auction engine itself, where the auctions are run.

FIG. 22 shows an exemplary embodiment of the physical network for the method and system of the present invention. A router 2202, such as a Cisco router is connected to a network, such as the Internet 2201. In an embodiment of the invention, an auction application of the method and system of the present invention is deployed at a co-location facility that provides a 100 Mbps connection to the Internet 2201. Router 2202 is connected to switch 2203, which may be a 10 Mpbs/100 Mpbs switch associated with a public network. Switch 2203 is connected to production auction server 2204, which may be designated as the hot production server. Switch 2203 is also connected to backup server 2206, which may be designated as a warm backup server. Production auction server 2204 and backup server 2206 are connected to switch 2205, which may be designated a private network switch and may be associated with a private network. In an embodiment of the invention, digital streams to and from the Internet 2201 pass through router 2202 and then switch 2203, which directs auction-related bit traffic over the associated public network to production auction server 2204. Backup server 2206 may also be on the same associated public network and serves as the fail-over for the production auction server 2204. Switch 2205 serves as a connection to the associated private network that contains other non-Internet related applications.

FIG. 23 shows an overview of an embodiment of an auction server 2301 of the method and system of the present invention. Auction server 2301 may contain one or more databases 2302, an OMS 2305, a bid manager 2306, an auctioneer 2303, and an administrator 2304. Auctioneer 2303, administrator 2304, and bid manager 2306 all have access to the OMS 2305. In an embodiment of the invention, auctioneer 2303, administrator 2304, and bid manager 2306 may have varying degrees of access to the OMS 2305. OMS 2305 is an order management system that is associated with one or more databases 2302. Bid manager 2306 is connected to web server 2307, which is in turn connected to a network, such as the Internet 2308.

FIG. 24 shows a more detailed view of an exemplary systems architecture for the method and system of the present invention. Order Management System 2410, or OMS, as exemplified by an OMS/CoreOMS with the OpenBook system Extensions in an embodiment of the invention, is responsible for tracking the principal objects of the system, which may include information associated with users, accounts, auctions, positions, and fills. Order Management System 2410 may implement user-based authentication and role-based authorization. In an embodiment of the invention, Order Management System 2410 may also implement a Java RMI-based API/SPI for client access and is the locus for timing and events throughout the system. In an embodiment of the invention, Order Management System 2410 uses Relational Backing Store 2407 to locate and keep the principal objects available in a persistent storage device. In an embodiment of the invention, Relational Backing Store 2407 is responsible for mapping the principal objects of the system onto a relational schema, locating and keeping the principal objects of the OpenBook system available in a persistent storage, and for obeying referential integrity constraints of the data model. In an embodiment of the invention, Relational Backing Store 2407 implements a Java JDBC interface to the vendor Relational Database System 2408, such as the Sybase Adaptive Server Enterprise.

In an embodiment of the invention, OpenBookManager 2406 is responsible for bidder account management, multiplexing a bidder-role based interface to the Order Management System 2410, and position management for authorized accounts and to provide a single listener interface for state changes in active auctions. The OpenBookManager 2406 makes state and position information available to clients for use by any user interface system that does not use the Order Management System 2410 API/SPI directly.

In an embodiment of the invention, the OpenBook system Servlet Interface 2405 provides programmatic execution linkage between the Java Servlet Engine 2404 API Specification and the OpenBookManager 2406 module. Servlet invocations are mapped to OpenBookManager 2406 interfaces to allow user interfaces to be constructed for HTML. The OpenBook Servlet Interface 2405 is invoked and controlled by Java Servlet Engine 2404, which may be a $3^{rd}$ party Java Servlet Engine such as JRun from Allaire. JRun is in turn utilized by the $3^{rd}$ party HTTP web server 2402, which may be Zeus from Zeus Technology. HTTP web server 2402 is in turn connected to Web Browser User Interface 2401.

In an embodiment of the invention, HTML Templates 2403 are provided to allow for the separation of functionality between the OpenBook Servlet Interface 2405 module and the HTML designer. Server Side Include template mappings may be provided for the principal objects of the system and all their attributes, as well as system attributes such as time and date. Multiple browser products may be supported and accommodated.

Auction Server Database Schema

In an embodiment of the invention, an exemplary database schema for an auction server of the method and system of the present invention will now be described.

In an embodiment of the invention, an auctiondb database may represent the Relational Backing Store (RBS) 2407, as shown in FIG. 24. This database is associated with the auction server of the method and system of the present invention.

The following statements clean out any existing auction database to set up an auction:

use master dump transaction master with no_log drop database openbook go

The following creates an empty auction database:

create database openbook on data=10 log on logs=10 go use openbook go

A users table defines static information about entities that are allowed access to parts of the system. Referring to FIG. 23, a user may be an administrator 2304, an auctioneer 2304, a bid manager 2306, an entity in an auditor role, or an entity that sets up accounts. The degree of access to various components may be determined by the UserRoles table. Each user is assigned a unique UserID which is used to refer to the user from other tables. An embodiment is as follows:

```
create table openbook..users (
        tStamp datetime              not null,
        ownerId numeric(18,0)        not null,
        id numeric(18,0)             not null,
        userName varchar(60)         not null,
        contactName varchar(80)      null,
        securityType int             not null,
        securityKey varchar(255)     null,
        status int                   not null,
        unique (id),
        unique (userName)
)
print "Created openbook..users"
go
```

A userLog table relates to security and error checking for users in the method and system of the present invention. Whenever an action is taken, the userlog is updated to catalog the action. An embodiment is as follows:

```
create table openbook..userLog (
        editId numeric(18,0)         not null
            references openbook..users(id),
        txId numeric(18,0)           not null,
        action int                   not null,
        tStamp datetime              not null,
        ownerId numeric(18,0)        not null,
        id numeric(18,0)             not null references openbook..users
(id),
        userName varchar(60)         not null,
        contactName varchar(80)      null,
        securityType int             not null,
        securityKey varchar(255)     null,
        status int                   not null,
        unique (txId)
)
print "Created openbook..userLog"
go
```

An accounts table is used to record information associated with end users, such as investors associated with the method and system of the present invention. Examples of end users are institutional buyers, individual investors, and retail users. An embodiment is as follows:

```
create table openbook..accounts (
        tStamp datetime              not null,
        ownerId numeric(18,0)        not null
            references openbook..users(id),
        id numeric(18,0)             not null,
        account varchar(80)          not null,
        name varchar(60)             not null,
        status int                   not null,
        securityKey varchar(60)      null,
        contactName varchar(80)      null,
        company varchar(60)          null,
        address1 varchar(60)         null,
        address2 varchar(60)         null,
        address3 varchar(60)         null,
        city varchar(50)             null,
        state varchar(20)            null,
        zip varchar(20)              null,
        country varchar(50)          null,
        directPhone varchar(30)      null,
        mobilePhone varchar(30)      null,
        faxNumber varchar(30)        null,
        emailAddress varchar(80)     null,
        challenge varchar(80)        null,
        response varchar(80)         null,
        companySwitchboard varchar(30)  null,
        wrhManager1 varchar(80)      null,
        wrhManager2 varchar(80)      null,
        clearingAccount varchar(80)  null,
        instructions varchar(80)     null,
        accountManager varchar(80)   null,
        accountNameDisclosed bit     not null,
        accountType varchar(8)       null,
        bloomberg varchar(80)        null,
        bocName varchar(80)          null,
        bocPhone varchar(30)         null,
        bocEmail varchar(80)         null,
        creditLimit float            null,
        agreementSigned datetime     null,
        unique (id),
        unique (account)
)
print "Created openbook..accounts"
go
```

An accountLog table is used to record and catalog all actions taken by given account. An embodiment is as follows:

```
create table openbook..accountLog (
        editId numeric(18,0)         not null
            references openbook..users(id),
        txId numeric(18,0)           not null,
        action int                   not null,
        tStamp datetime              not null,
        ownerId numeric(18,0)        not null
            references openbook..users(id),
        id numeric(18,0)             not null references
openbook..accounts (id),
        account varchar(80)          not null,
        name varchar(60)             not null,
        status int                   not null,
        securityKey varchar(60)      null,
        contactName varchar(80)      null,
        company varchar(60)          null,
        address1 varchar(60)         null,
        address2 varchar(60)         null,
        address3 varchar(60)         null,
        city varchar(50)             null,
        state varchar(20)            null,
        zip varchar(20)              null,
        country varchar(50)          null,
        directPhone varchar(30)      null,
        mobilePhone varchar(30)      null,
        faxNumber varchar(30)        null,
        emailAddress varchar(80)     null,
        challenge varchar(80)        null,
        response varchar(80)         null,
        companySwitchboard varchar(30)  null,
        wrhManager1 varchar(80)      null,
        wrhManager2 varchar(80)      null,
        clearingAccount varchar(80)  null,
        instructions varchar(80)     null,
        accountManager varchar(80)   null,
        accountNameDisclosed bit     not null,
        accountType varchar(8)       null,
        bloomberg varchar(80)        null,
        bocName varchar(80)          null,
        bocPhone varchar(30)         null,
        bocEmail varchar(80)         null,
        creditLimit float            null,
        agreementSigned datetime     null,
        unique (txId)
)
print "Created openbook..accountLog"
go
```

A roles table provides a convenient repository for security roles defined by the auction system. Each role is assigned a unique RoleID. This RoleID is referred to by a UserRoles table. Semantics of roles are defined by the application. The roles of users may be checked to determine if a user has access to certain resources or is allowed to perform various tasks. An embodiment is as follows:

```
create table openbook..roles (
    roleId numeric(18,0)      not null,
    roleName varchar(20)      not null,
    unique (roleId),
    unique (roleName)
)
print "Created openbook..roles"
go
```

The userRoles table enumerates all of the roles that are associated with a particular user. An embodiment is as follows:

```
create table openbook..userRoles (
    userId numeric(18,0)    not null
        references openbook..users(id),
    roleId numeric(18,0)    not null
        references openbook..roles(roleId)
)
``` create unique index userRolesIndex on openbook..userRoles (userId, roleId)

create index userRolesUserIndex on openbook..userRoles (userId)

create index userRolesRolesIndex on openbook..userRoles (roleId)

print "Created openbook..userRoles"

go

In an embodiment of the invention, a userRoleLog table represents the complete transaction history of each role change for each user known to the system. Each transaction is assigned a unique userRoleTxID. An embodiment is as follows:

```
*/
create table openbook..userRoleLog (
    userRoleTxId numeric(18,0)        not null,
    editId numeric(18,0)              not null
        references openbook..users(id),
    userId numeric(18,0)              not null
        references openbook..users(id),
    roleId numeric(18,0)              not null
        references openbook..roles(roleId),
    action int                        not null
)
print "Created openbook..userRoleLog"
go
```

In an embodiment of the invention, view userRoleNames is associated with the same data as userRoles but provides user and role names instead of ids. An embodiment is as follows:

*/ create view userRoleNames as
  select userName, roleName
  from openbook..userRoles ur, users u, roles r
  where ur.userId=u.id and ur.roleId=r.roleId print "Created openbook..userRoleNames"

go

An auctions table defines actual auctions that are run. Each auction is associated with a set of parameters defining that auction. Click-through parameters may also be used. Table values for parameters may be stored. In an embodiment of the invention, parameters that are required and must be provided are the ones listed as "not null" in the following exemplary embodiment:

```
create table openbook..auctions (
    tStamp datetime                             not null,
    ownerId numeric(18,0)                       not null
        references openbook..users(id),
    id numeric(18,0)                            not null,
    cusip varchar(12)                           not null,
    description varchar(255)                    null,
    status int                                  not null,
    totalAvailable int                          not null,
    minValue float                              not null,
    maxValue float                              not null,
    valueIncrement float                        not null,
    lotSize int                                 not null,
    openTime datetime                           not null,
    closeTime datetime                          not null,
    alert varchar(255)                          null,
    announcedSize int                           not null,
    minAuctionSize int                          not null,
    maxAuctionSize int                          not null,
    auctionFormat varchar(80)                   null,
    benchmarkDesignationTime int                not null,
    benchmarkDollarPriceAtPricing float         not null,
    benchmarkRateAtPricing float                not null,
    benchmarkRateMax float                      not null,
    benchmarkTreasury varchar(15)               null,
    benchmarkCusip varchar(12)                  null,
    bondsFreeToTradeAt int                      not null,
    clearingSpread float                        not null,
    jointManagers varchar(80)                   null,
    compSizeIncrement int                       not null,
    couponDates varchar(100)                    null,
    couponFrequency varchar(15)                 null,
    couponRate float                            not null,
    dollarPrice float                           not null,
    evalInterval int                            not null,
    faceValue float                             not null,
    finalPricingTime int                        not null,
    issuer varchar(50)                          null,
    listed varchar(15)                          null,
    maturity datetime                           null,
    accruedInterest float                       not null,
    maxBidIncrease float                        not null,
    maxCompSize int                             not null,
    maxNonCompSize int                          not null,
    maxPurchase float                           not null,
    minCompSize int                             not null,
    minNonCompSize int                          not null,
    nonCompSizeIncrement int                    not null,
    pricingTime int                             not null,
    protectedSpread float                       not null,
    rating varchar(40)                          null,
    sellingConcession float                     not null,
    settlementDate datetime                     null,
    settlementTerms varchar(80)                 null,
    issueDate datetime                          not null,
    sizingTime int                              not null,
    softDollarEarlyCutoff int                   not null,
    softDollarEarlyPercent float                not null,
    softDollarLatePercent float                 not null,
    structure varchar(80)                       null,
    term int                                    not null,
    typeOfIssue varchar(30)                     null,
    wrhManagerRole varchar(30)                  null,
    yieldToMaturity float                       not null,
    unique (id),
    unique (cusip)
)
print "Created openbook..auctions"
go
```

In an embodiment of the invention, 'view deals' allows users to see views for report generation and reporting purposes, such as for those who monitor an auction. Views may be created so that databases do not have to be queried each time a report needs to be run. In an embodiment of the invention, data is already assembled and fed into reporting structures associated with method and system of the present invention. An embodiment is as follows:

create view deals as
    select tStamp, ownerId, id, cusip, description, status
    from openbook..auctions print "Created view deals"

go

An auctionLog table is used to catalog and record all actions taken for a particular auction. In an embodiment of the invention, user changes are recorded in the auctionLog table. In an embodiment of the invention, parameters may be changed by a user. An embodiment is as follows:

```
create table openbook..auctionLog (
    editId numeric(18,0)                            not null
        references openbook..users(id),
    txId numeric(18,0)                              not null,
    action int                                      not null,
    tStamp datetime                                 not null,
    ownerId numeric(18,0)                           not null
        references openbook..users(id),
    id numeric(18,0)                                not null references
openbook..auctions (id),
    cusip varchar(12)                               not null,
    description varchar(255)                        null,
    status int                                      not null,
    totalAvailable int                              not null,
    minValue float                                  not null,
    maxValue float                                  not null,
    valueIncrement float                            not null,
    lotSize int                                     not null,
    openTime datetime                               not null,
    closeTime datetime                              not null,
    alert varchar(255)                              null,
    announcedSize int                               not null,
    minAuctionSize int                              not null,
    maxAuctionSize int                              not null,
    auctionFormat varchar(80)                       null,
    benchmarkDesignationTime int                    not null,
    benchmarkDollarPriceAtPricing float             not null,
    benchmarkRateAtPricing float                    not null,
    benchmarkRateMax float                          not null,
    benchmarkTreasury varchar(15)                   null,
    benchmarkCusip varchar(12)                      null,
    bondsFreeToTradeAt int                          not null,
    clearingSpread float                            not null,
    jointManagers varchar(80)                       null,
    compSizeIncrement int                           not null,
    couponDates varchar(100)                        null,
    couponFrequency varchar(15)                     null,
    couponRate float                                not null,
    dollarPrice float                               not null,
    evalInterval int                                not null,
    faceValue float                                 not null,
    finalPricingTime int                            not null,
    issuer varchar(50)                              null,
    listed varchar(15)                              null,
    maturity datetime                               null,
    accruedInterest float                           not null,
    maxBidIncrease float                            not null,
    maxCompSize int                                 not null,
    maxNonCompSize int                              not null,
    maxPurchase float                               not null,
    minCompSize int                                 not null,
    minNonCompSize int                              not null,
    nonCompSizeIncrement int                        not null,
    pricingTime int                                 not null,
```

-continued

```
    protectedSpread float                           not null,
    rating varchar(40)                              null,
    sellingConcession float                         not null,
    settlementDate datetime                         null,
    settlementTerms varchar(80)                     null,
    issueDate datetime                              not null,
    sizingTime int                                  not null,
    softDollarEarlyCutoff int                       not null,
    sofiDollarEarlyPercent float                    not null,
    softDollarLatePercent float                     not null,
    structure varchar(80)                           null,
    term int                                        not null,
    typeOfIssue varchar(30)                         null,
    wrhManagerRole varchar(30)                      null,
    yieldToMaturity float                           not null,
    unique (txId)
)
print "Created openbook..auctionLog"
go
```

In an embodiment of the invention, view dealLog shows views for a particular deal. View dealLog may be used for reporting or other purposes. An embodiment is as follows:

create view dealLog as
    select editId, txId, action, tStamp, ownerId, id,
    cusip, description, status
    from openbook..auctionLog print "Created view dealLog"

go

A positions table records the structures for bids, including such objects as sizes, timestamps, initial bid spreads, and final bid spreads. In an embodiment of the invention, for a non-competitive bid, a size and a timestamp is logged. In an embodiment of the invention, for a competitive bid, a size, a final bid spread, an initial bid spread, and a timestamp are logged. In an embodiment of the invention, user accounts may be referenced. The positions table may also index by account and/or by auction. An embodiment is as follows:

```
create table openbook..positions (
    tStamp datetime                                 not null,
    ownerId numeric(18,0)                           not null
        references openbook..users(id),
    id numeric(18,0)                                not null,
    dealId numeric(18,0)                            not null
        references openbook..auctions (id),
    account varchar(80)                             not null,
    size int                                        not null,
    minFillSize int                                 not null,
    status int                                      not null,
    value float                                     not null,
    initialValue float                              not null,
    nonCompSize int                                 not null,
    treasuries float                                null,
    priority_tStamp datetime                        null,
    priority_size int                               null,
    nonCompPriority_tStamp datetime                 null,
    nonCompPriority_size int                        null,
    unique (id),
    unique (account, dealId)
)
print "Created openbook..positions"
go
``` in an embodiment of the invention, table positionLog records changes that are made to a positions table. In an embodiment of the invention, examples of changes are changes in spread, changes in size, and changes in timestamp. All actions for accounts may be logged. Table positionLog may be indexed per auction, via unique auctionIDs for each auction, and/or cross-referenced with user IDs. An embodiment is as follows:

```
create table openbook..positionLog (
    editId numeric(18,0)                    not null
        references openbook..users(id),
    txId numeric(18,0)                      not null,
    action int                              not null,
    tStamp datetime                         not null,
    ownerId numeric(18,0)                   not null
        references openbook..users(id),
    id numeric(18,0)                        not null references
openbook..positions (id),
    dealId numeric(18,0)                    not null
        references openbook..auctions (id),
    account varchar(80)                     not null,
    size int                                not null,
    minFillSize int                         not null,
    status int                              not null,
    value float                             not null,
    initial Value float                     not null,
    nonCompSize int                         not null,
    treasuries float                        null,
    priority__tStamp datetime               null,
    priority__size int                      null,
    nonCompPriority__tStamp datetime        null,
    nonCompPriority__size int               null,
    unique (txId)
)
print "Created openbook..positionLog"
go
```

In an embodiment of the invention, a fills table may store information about bonds that are awarded. An end user may set up a position. The end user may or may not get a fill, based on the other positions in the auction and other factors. An embodiment is as follows:

```
create table openbook..fills (
    tStamp datetime                         not null,
    ownerId numeric(18,0)                   not null
        references openbook..users(id),
    id numeric(18,0)                        not null,
    indicationId numeric(18,0)              not null
        references openbook..positions (id),
    value float                             not null,
    size int                                not null,
    status int                              not null,
    softDollarAllocation float              not null,
    unique (id)
)
print "Created openbook..fills"
go
```

In an embodiment of the invention, a fillLog table catalogs and records changes to fills. Examples of changes include changes made by an administrator due to mistakes, suspect bids, and/or decisions to sell a lesser quantity or otherwise modify bids. In an embodiment of the invention, an administrator or other party may change bids.

```
create table openbook..fillLog (
    editId numeric(18,0)                    not null
        references openbook..users(id),
    txId numeric(18,0)                      not null,
    action int                              not null,
    tStamp datetime                         not null,
    ownerId numeric(18,0)                   not null
        references openbook..users(id),
    id numeric(18,0)                        not null references openbook..fills
    (id),
    indicationId numeric(18,0)              not null
        references openbook..positions (id),
    value float                             not null,
    size int                                not null,
    status int                              not null,
    softDollarAllocation float              not null,
    unique (txId)
)
print "Created openbook..fillLog"
go
``` create clustered index fillsBidIdIndex on openbook..fills(id)

go

An embodiment of a database schema dump or exit is as follows:

checkpoint go sp_dropdevice dbdumpfile go sp_adddumpdevice "disk", dbdumpfile, "/tmp/dbdump"

go dump database openbook to dbdumpfile go

_EOF_

/bin/rm-f/tmp/dbdump exit 0

In an embodiment of the invention, the method and system of the present invention is associated with a corporate bond origination via a single-price auction. In an embodiment of the invention, states of the auction may include NOT OPEN, OPEN, WITHDRAWN, PRICING, CLOSED, RUNNING, ALLOCATED, and FILLED.

In an embodiment of the invention, time is a required component of the auction, and each phase may be captured in the system as a state. In an embodiment of the invention, each state is strictly independent from the rest: the auction is in exactly one state at any given time, no two states overlap, and there is no period of time that is not covered by exactly one state. In an embodiment of the invention, the transition from one state to the next is atomic.

In the NOT_OPEN state, the auction is not yet open. In an embodiment of the invention, this state begins at the instant the auction is first created in the system and continues until the transition to the OPEN state. No positions may be created, modified, or cancelled. All auctions are created in this state, and this is a state into which a transition from another state may not be made. The method and system of the present invention may only transition to the OPEN state from the NOT_OPEN state.

In the OPEN state, the auction is open, and positions from qualified accounts and authorized users can be created, modified, or cancelled. In an embodiment of the invention, this state begins at the moment the auction is opened and continues until the transition to the PRICING state or the WITHDRAWN state. Due to vagaries of system timing, this state may not be used as the definitive control over when position operations are accepted by the method and system of the present invention. It may be expected that the duration of this state will be from the openTime auction attribute through the closeTime auction attribute. See discussion below about timing.

In the WITHDRAWN state, the auction is withdrawn. This state begins at the moment the auction is withdrawn and continues indefinitely, or until it is reset to the OPEN state. It is used to signal that an auction has been suspended or cancelled. In an embodiment of the invention, no position operations are accepted, though some positions may already exist in the method and system of the present invention.

In the PRICING state, the system is being prepared to accept final pricing items. This state begins at the moment as close as possible to immediately following a close time and ends at the transition to the CLOSED state or the WITHDRAWN state. During this state, position operations are only allowed by those users with a syndicate role authorized. In an embodiment of the invention, a new position for the syndicate may be entered in order to effect a syndicate long position; a total available auction attribute may be modified during this state. This amount may be different from the auction attribute announced size, and can be used to effect a syndicate short position.

In the CLOSED state, the auction is closed, and no further position operations are allowed. The state begins at the moment the syndicate manager closes the auction and ends when the auctioneer transitions the auction to the RUNNING state.

In the RUNNING state, the auctioneer, is in the process of calculating the clearing value and generating allocations. In an embodiment of the invention, queries to the book may produce intermediate results. If an error occurs in the RUNNING state, the auction is reverted to the CLOSED state and all allocations are cancelled. At the successful conclusion of allocation generation, the state is changed to ALLOCATED.

In the ALLOCATED state, the auction has been allocated, and executions have been created and are available. In an embodiment of the invention, the final auction attributes, such as coupon, price, and other attributes, may be computed and published by users who have the syndicate role authorized. For the first few minutes after entering this state, the treasuries position attribute may be modified for positions that received a fill; this time ends at a close time+final pricing time but does not start until this state is entered.

In the FILLED state, the auction is filled, and no position operations or auction operations are allowed. Fills may be transmitted to third parties, such as clearing brokers, winning bidders, and/or other parties. This state begins when the auctioneer has finished generating fills, and the FILLED state may continue indefinitely.

In an embodiment of the invention, time in an auction may be handled as follows. Normal position operations may be allowed at certain times. When a position operation is attempted, the position is given a timestamp by the order management system of the method and system of the present invention. In an embodiment of the invention, this timestamp is assigned the earliest possible time in the order management system to allow for the earliest value to be used. This timestamp improves fairness and consistency, in that different operations may take differing amounts of time, so obtaining a proposed timestamp reduces this variation. In an embodiment of the invention, this timestamp is then rounded down to the nearest hundredth of a second.

In an embodiment of the invention, before a position creation, modification, or cancellation is allowed, a proposed timestamp may be checked against an open time; if the timestamp is greater than or equal to the open time, the timestamp is checked against the close time; if the timestamp is less than the close time, then the state of the auction is checked; if the state of the auction is not WITHDRAWN then the operation is allowed to succeed. This procedure enables handling of the situation of accepting a bid received after the open time but strictly before the transition to the OPEN state, as well as not accepting a bid received after the close time but strictly before the transition out of the OPEN state.

In an embodiment of the invention, time issues are also addressed with regards to priority for competitive and non-competitive bids. When any change is made to any object, a timestamp is recorded by the order management system for auditing purposes. If the operation results in a priority timestamp being reset, the timestamp of the last change for the position is used.

In an embodiment of the invention, timing of evaluation for an auction may be associated with an auction attribute evalInterval, which is expressed in seconds. In an embodiment of the invention, specific times of evaluation may be calculated by working backwards from the close time, so that the final evaluation interval ends precisely at the close time. In an embodiment of the invention, those who define auctions may be cautioned against using an evalInterval that makes for confusing timestamps.

Referring again to FIG. 6, an end user may initiate an auction of the method and system of the present invention by logging into the auction server 604 in order to identify the end user to the server. Data transmitted to and from the website may be secured via a well-known encryption mechanism. FIG. 7 shows an exemplary login screen for the present invention. An end user, such as an investor, enters the investor's account number 701 and password 702. The user may receive an account number 701 and password 702 after registering with the method and system of the present invention.

In an embodiment of the invention, in order to register with the method and system of the present invention, an investor may open an account by filling out a customer application form, signing a customer agreement and participation agreement, and receiving approval from a customer account staff associated with the method and system of the present invention. In certain instances, an investor may use an existing account with a third party broker-dealer designated by staff associated with the method and system of the present invention as bidder conduits.

Referring again to FIG. 7, the end user is also prompted to enter an auction key 704. In an embodiment of the invention, each auction is announced one to two days ahead of time. Registered participants are notified of an auction electronically. Auctions move rapidly, usually lasting two hours. When registered participants are notified electronically, they may receive an auction key 703 for that given auction.

If the end user selects initial terms 705, an initial terms screen exemplified by FIG. 8 is shown to the user. FIG. 8 shows details for the auction, including a title 801 and initial terms 802, which may include such terms as the issuer, an issue size, a maturity date, a coupon rate, a settlement date, settlement terms, a type of issue, coupon dates, a structure, a format, a quality rating, a benchmark treasury, a maximum benchmark rate, a minimum/maximum spread, a protected spread, an auction date and time, a pricing date and time, a maximum purchase limit, a minimum and multiple investment, a listing designation, soft dollar terms, names of co-managers, and a selling concession.

Referring again to FIG. 7, if the end user selects submit 704, the method and system of the present invention checks a security database to match the account number 701 and password 702 information entered by the end user. If the information entered matches an end user registered in the system, the system checks the auction key 703 entered by the end user. If the end user is properly registered and the auction key 703 entered is correct, the end user is shown a pre-auction screen as exemplified in FIG. 9.

During the pre-auction phase exemplified by FIG. 9, bids are not accepted, as shown by the auction progress window 901. During the pre-auction phase and throughout the auction, the end user may be shown auction details 902, which provides details about the auction. Auction start 903 shows the start time for the auction, and auction finish 904 shows the ending time for the auction. Min/max spread 905 shows a largest and smallest bid spread in basis points over a benchmark Treasury allowed during the auction.

Protected spread range 906 shows a maximum spread range, under an initial bid, that an end user may modify a final bid, without canceling the end user's existing competitive bid. Improving an initial bid by more than the protected spread range results in cancellation of the original bid and entry of a new bid with a new timestamp. In the example, the protected spread range 906 is a 4 basis point spread. Benchmark Treasury 907 relates to a chosen reference U.S. Treasury security of comparable maturity to the bonds being auctioned. The benchmark Treasury yield may be used to price the bond after the auction. In an embodiment of the invention, if the benchmark Treasury yield is above the maximum rate at pricing, the issuer is allowed, but not required, to cancel the auction.

After an auction has begun, the end user is shown a screen such as the one in FIG. 10. Auction progress window 901 shows the current time and the time remaining in the auction. Cumulative bid chart 1002 shows the total cumulative bids, which is $500 million in the example auction shown. Cumulative bid chart 1002 also shows the distribution of the initial bids, cumulatively grouped in a bar chart format by basis point spread (bps). In the example, there are a total of 24 initial bids, and all 24 initial bids are at or below 105 bps. In the example, 23 bids are below 104 bps, which shows that there was (24−23=1) one initial bid at 105 bps. This cumulative bid chart provides a clue to the end user as to what bps the end user may have to bid in order to have a feasible chance at successfully winning the auction. In the example in FIG. 9, if none of the bids are modified, the end user knows that a final bid of 105 bps would presently garner no legitimate chance of winning because there are already more than $450 million worth of bids at 104 bps and below, and the total amount of bonds up for auction is between $300 million and $450 million. Only initial bids, not final bids, are shown by the cumulative bid chart 902, but the protected spread range 906 does provide a guide for the end user as to where the final bids may fall. In an embodiment of the invention, the cumulative bid chart 1002 is color coded into three colors, one color for bids that may be above a hypothetical clearing price, a second color for bids that may or may not be above the clearing price, and a third color for bids that would be below the clearing price.

If the user clicks or selects nominal chart 1001, a nominal bid chart 1102 is communicated to the end user, as shown in FIG. 11. Nominal bid chart 1102 shows the number of initial bids, grouped in bar graph form, for each basis point spread. Also shown is the quantity of bonds initially requested at each basis point spread. In the example shown in FIG. 11, there are only two initial bids at 103 bps, but they account for a large quantity of bonds ($110 million worth at 103 bps). In an embodiment of the invention, the nominal bid chart 1102 is color coded into three colors, one color for bids that may be above a hypothetical clearing price, a second color for bids that may or may not be above the clearing price, and a third color for bids that would be below the clearing price.

If the user clicks or selects bid data 1103, a bid data table 1202 is communicated to the end user, as shown in FIG. 12. Bid data table 1202 shows each bid, ordered by bps. In the example, the first bid shown is a noncompetitive bid "N" at a quantity of 10 timestamped at 9:00 ET. In an embodiment of the invention, the entries in the bid data table 1202 are color coded into three colors, one color for bids that may be above a hypothetical clearing price, a second color for bids that may or may not be above the clearing price, and a third color for bids that would be below the clearing price. If there are too many bids to display in one screen for the bid data table 1202, the end user may click or select the see remaining bids button to show additional bids.

Referring again to FIG. 12, the end user may elect to place a bid by entering bid information in the place bid window 1201. Place bid window 1201 appears on the end user's screen when the auction begins and remains on the user screen if the user chooses to cycle through the various bid history charts and tables. In an embodiment of the invention, the end user may choose to place a competitive bid 1203, a non-competitive bid 1208, or both a competitive bid 1203 and a non-competitive bid 1208. For either a competitive bid 1203 or a non-competitive bid 1208, the end user must enter a size 1205. Size 1205 is the bid amount, in millions. In an embodiment of the invention, the minimum competitive bid is $1 million and can be increased in increments of $1,000. The minimum non-competitive bid is $1,000 and can be increased in increments of $1,000. An investor may increase the size of an existing bid by up to 50% and keep the original timestamp. In an embodiment of the invention, increasing the size of a bid by more than 50% will result in cancellation of the original bid and entry of a new bid with a new timestamp 1204.

In an embodiment of the invention, for a competitive bid 1203, the end user must also enter an initial bid 1206 and a final bid 1207. Initial bid 1206 is the spread in basis points of a competitive bid, which is revealed anonymously to other investors. In an embodiment of the invention, the final bid 1207 can only be set at or below the initial bid but may not differ from the initial bid by more than the protected spread range 906. The final bid 1207 may be changed at any time prior to the end of the auction. Setting the final bid 1207 below the initial bid 1206 by more than the protected spread range will result in cancellation of the original bid and entry of a new bid with a new timestamp 1204.

In an embodiment of the invention, max bid 1210 is the maximum amount a specific investor may bid in a given auction. When added together, the size of an investor's competitive bid 1203 and noncompetitive bid 1208 may not exceed the maximum bid size indicated by max bid 1210. In the example shown in FIG. 12, the max bid 1210 is $75 million.

If the end user properly enters bid information in place bid window 1201 and clicks or selects submit bid 1211, the confirm bid screen shown in FIG. 13 may be communicated to the end user. If the end user has improperly entered bid information, such as by entering a bid that exceeds the maximum bid allowed for a specific investor, an error screen such as the one shown in FIG. 20 is communicated to the end user. In FIG. 20, the error 2001 describes the mistake to the user in the place bid 1201 window. In the example shown in FIG. 20, the bid exceeded the maximum bid allowed, is communicated to the user.

Referring again to FIG. 12, if the user has properly entered a bid, the confirm bid screen shown in FIG. 13 may be communicated to the user. Confirm bid window 1301 appears, reminding and summarizing the end user's previously entered bid information. If the end user has made a mistake or changes his or her mind, the end user may click or select back 1302 to return to a previous place bid screen.

Figure 14:
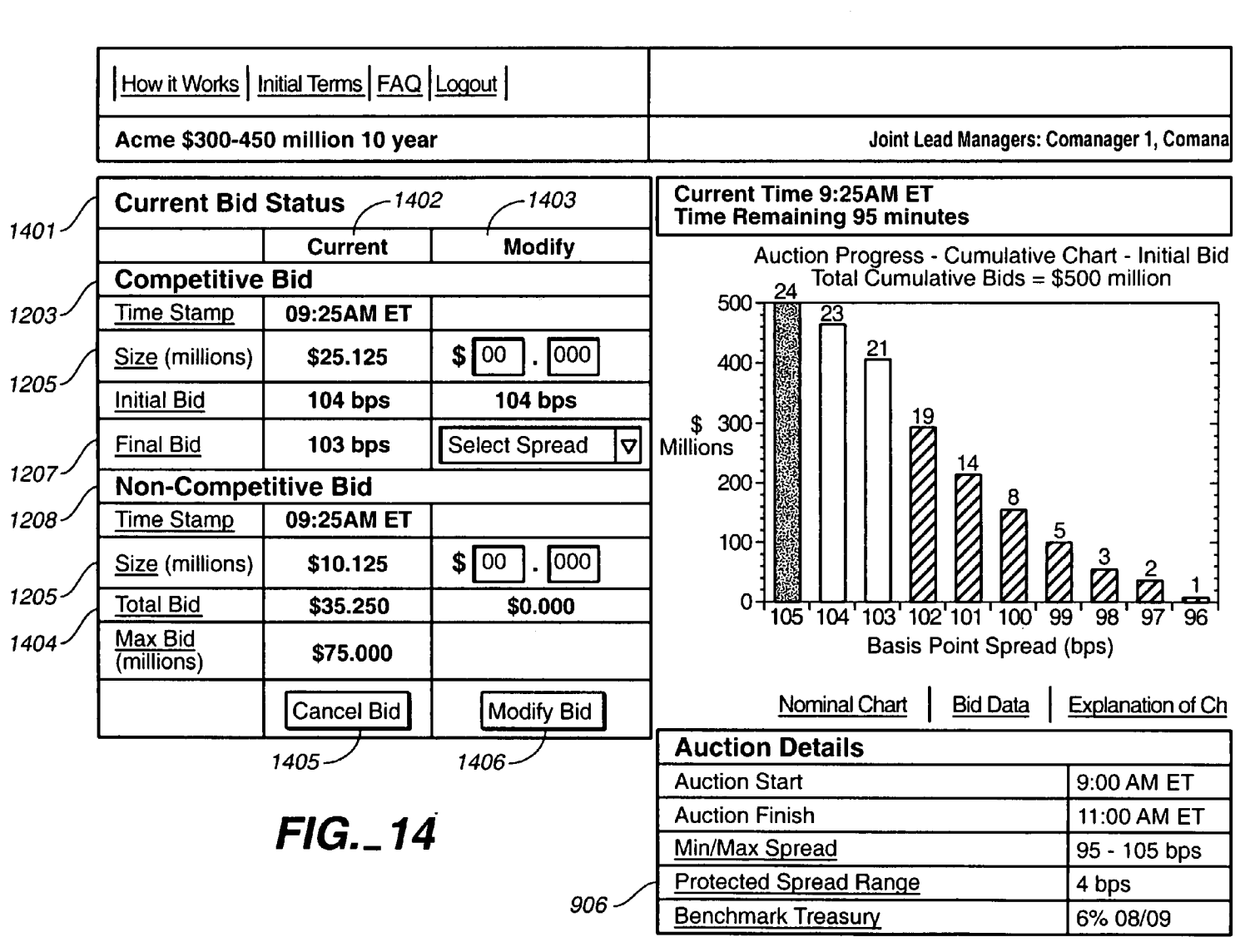

If the end user selects confirm bid 1303, the current bid status screen, as shown in FIG. 14, is communicated to the end user. Current bid status window 1401 contains a current status column 1402 and a modify column 1403. Current status column 1402 displays the present bid or bids of the end user. Also communicated to the user is total bid 1404, which is the sum of competitive bid 1203 and non-competitive bid 1208.

If the end user wishes to modify 1403 a bid, the end user may elect to change the size 1205 of the bid. For a competitive bid 1203, the user may change the spread for the final bid 1207, subject to constraints such as the protected spread range 906. In an embodiment of the invention, another constraint on modifying the size 1205 of the bid is that the size a bid may be increased by up to 50% at any time during the auction without changing the timestamp. If the end user increases the quantity of a bid by more than 50%, that existing bid will be cancelled, and a new bid entered with the new size and a new timestamp.

In an embodiment of the invention, as a further constraint, the size of a bid cannot be decreased without canceling it. An investor may cancel bids at any time during an auction. The method and system of the present invention may exclude bidders for any reason, including activity that is disruptive to the auction process.

In an embodiment of the invention, investors are given a maximum bid size limit that varies with credit and/or other methods established by the method and system of the present invention. When added together, the size of an investor's competitive bid and noncompetitive bid may not exceed the maximum bid size.

If the end user does decide to make a modification and clicks or selects a modify bid 1406, a screen such as the one shown in FIG. 15 is shown to the user.

In the example shown in FIG. 15, the end user has chosen to modify the final bid 1207 for the end user's competitive bid 1203. The end user may click or select back 1501 if the user has made a mistake or changed his or her mind, or the user may click or select confirm bid 1502 to accept the modification 1503 shown.

Referring again to FIG. 14, if the end user clicks or selects cancel bid 1405, the cancel bid screen shown in FIG. 21 is communicated to the user. In the cancel bid window 2101, in the example shown, the end user may choose to cancel competitive bid 2102, cancel non-competitive bid 2103, or cancel both bids 2104.

If in modifying a bid the end user selects a final bid outside of the protected spread range 906, the review bid window 1601 is communicated to the end user as shown in FIG. 16. A notation 1602 appears next to the unprotected improper final bid 1207, and a warning 1603 reminds the end user that accepting the final bid would result in the loss of the current timestamp 1204. If the end user changes his or her mind, he or she may click or select back 1604. If the end user wishes to continue with the new bid 1606, and therefore losing the old timestamp 1204, the end user may select submit bid 1605.

In an embodiment of the invention, if at the end of the auction, the end user has made one or more successful bids, a successful purchase window 1701 is communicated to the end user, as exemplified by the screenshot in FIG. 17. Total successful purchase 1704 shows the total purchase amount, in millions of dollars.

In an embodiment of the invention, soft dollars available 1702 shows the portion of the selling concession designated by an investor to be paid to a non-underwriting broker-dealer.

In an embodiment of the invention, a portion of the selling concession on each deal will be available to investors on a soft dollar basis. In an embodiment of the invention, winning bids with earlier timestamps are given a greater fraction of the selling concession in soft dollars. Investors may assign soft dollars to accounts of their choice. In an embodiment of the invention, investors have up to 24 hours after a deal prices to complete their soft dollar designations.

Size of benchmark for sale 1703 allows an investor to set an amount of the benchmark Treasury to sell, up to 15 minutes after the end of the auction. If the end user enters a dollar amount and clicks or selects sell treasuries 1705, that amount of treasuries will be sold. Within the first fifteen minutes after an auction, an end user may set and change the amount of the benchmark Treasury bonds the end user wishes to sell. The sale may be made at the prevailing market price at the time the deal prices, or approximately 30 minutes after the conclusion of an auction.

Auction results 1705 shows a clearing spread 1706, a final deal size 1707, and a time of final pricing 1708. Clearing spread 1706 shows the lowest spread in basis points over the benchmark Treasury that results in the sale of all of the bonds up to the final deal size 1707.

Final deal size 1707 shows the aggregate number of bonds to be sold and may be set by the issuer of the bonds a pre-specified time before the end of auction. Time of final pricing 1708 shows the final terms of a bond issue, with for example, the yield, price, and coupon set approximately one half-hour after the end of the auction.

If an end user fails to make one or more successful bids at the conclusion of the auction, a screen such as the one shown in FIG. 18 and continued in FIG. 19 is communicated to the end user. Auction results 1801, the end user's bid or bids 1803, and initial auction terms 1802 are communicated to the unsuccessful end user.

In an embodiment of the invention, the method and system of the present invention uses a modified Dutch Auction format. In a Dutch Auction, winning bidders pay a market-clearing price, that is, the highest price that sells out all securities offered in the auction.

In an embodiment of the invention, at the end of the auction, orders are filled working from the lowest-spread bids up to the spread that sells out the entire offering. All who bid below the clearing spread have their orders filled at the clearing spread. Bids at the clearing spread are awarded in timestamp order. In the event of ties in spread and timestamp, bonds are awarded pro-rata. If the last accepted bid at the clearing spread requests more bonds than are available, all remaining bonds may be awarded within the final deal size to the bidder.

In an embodiment of the invention, if the benchmark Treasury bond yield moves up by a pre-specified number of basis points during an auction, the auction will be cancelled. If there are not enough orders to fill the final deal size announced by the issuer, the auction will also be cancelled.

In an embodiment of the invention, successful bidders at the end of an auction are notified electronically. Basic information about the auctioned bond are publicly available at a website associated with the method and system of the present invention after the conclusion of an auction. Such information may include, for example, size, yield, coupon, and maturity. Further details about the outcome of an auction and the demographics of bidders may be made available to those who are awarded bonds.

In an embodiment of the invention, bond pricing occurs approximately 30 minutes after the auction terminates. The clearing spread is added to the benchmark treasury rate to obtain the auction yield. The coupon rate on the bond may become the auction yield rounded down to the nearest 1/8%. The bond price that corresponds to the auction yield and coupon rate may be calculated to three decimal places. Bonds may be made available to trade shortly after pricing, subject completion of necessary documentation.

It will be understood by those skilled in these arts that this exemplary bond auction process described above, may equally be used for equity securities, commodities, and other types of securities.

Having described the invention in terms of a preferred embodiment, it will be recognized by those skilled in the art that various types of general purpose computer hardware may be substituted for the configuration described above to achieve an equivalent result. Similarly, it will be appreciated that arithmetic logic circuits are configured to perform each required means in the claims for processing internet communications between bidder, issuers and auction server nodes. It will be apparent to those skilled in the art that modifications and variations of the preferred embodiment are possible, which fall within the true spirit and scope of the invention as measured by the following claims.

We claim:

1. A computerized method for conducting an auction of securities to auction participants, the method comprising:
   providing a bid mechanism in a computer system for receiving a plurality of competitive bids each having:
   i. a quantity of securities to be purchased,
   ii. an initial price revealed to the auction participants and having an associated bid time stamp, and
   iii. a firm price within a predetermined range of the initial price, having the associated bid time stamp of the initial price, and not revealed to the auction participants other than the bidder who submitted the competitive bid;
   using the computer system to provide, based on the firm prices and associated bid time stamps, an allocation of the securities at a single clearing price that sells all of the securities; and
   using the computer system to provide monitoring of the auction as it occurs.

2. The method of claim 1 wherein the securities comprise equity securities or debt securities.

3. The method of claim 1 wherein the securities comprise commodities.

4. The method of claim 3 wherein the commodities comprise gold, silver or other commodities traded on a licensed commodity exchange.

5. The method of claim 1 wherein the bid mechanism comprises an open Dutch auction process.

6. The method of claim 1, wherein the bid mechanism further may receive a non-competitive bid which includes a desired quantity of securities and a designated minimum spread over a benchmark treasury security.

7. An apparatus for conducting an auction of securities to auction participants, the apparatus comprising:
   a computer system, connected to Internet communications devices whereby the auction participants at remote terminals can communicate with the computer system;
   a bid mechanism means coupled to the computer system for receiving a plurality of competitive bids each having:
   i. a quantity of securities to be purchased,
   ii. an initial price available through the computer system to the auction participants and having an associated bid time stamp, and
   iii. a firm price within a predetermined range of the initial price, having the associated bid time stamp of the initial price, and not made available through the computer system to the auction participants other than the bidder who submitted the competitive bid;
   an allocation means coupled to the bid mechanism means for allocation of the securities based on the firm prices and associated bid time stamps at a single clearing price that sells all of the securities; and
   a display means at the remote terminals, coupled to the computer system via the Internet for monitoring the auction as it occurs.

8. The apparatus of claim 7 wherein the securities comprise equity securities or debt securities.

9. The apparatus of claim 7 wherein the securities comprise commodities.

10. The apparatus of claim 9 wherein the commodities comprise gold, silver or other commodities traded on a licensed commodity exchange.

11. The apparatus of claim 7 wherein the bid mechanism comprises an open Dutch auction process.

12. A computer program product stored on a computer useable medium comprising computer code segments configured to:
    conduct an auction of securities on a computer network to auction participants;
    provide a bid mechanism for receiving a plurality of competitive bids each having:
    i. a quantity of securities to be purchased,
    ii. an initial price known to the auction participants and having an associated bid time stamp, and
    iii. a firm price within a predetermined range of the initial price, having the associated bid time stamp of the initial price, and not made available for viewing by the auction participants other than the bidder who submitted the competitive bid;
    provide an allocation of the securities based on the firm prices and associated bid time stamps at a single clearing price that sells all of the securities; and
    provide a system for monitoring the auction as it occurs.

13. The method of claim 1 wherein an identity of a bidder that entered a particular competitive bid is not revealed in association with the initial price of the particular competitive bid.

14. The method of claim 2 wherein the debt securities comprise one of corporate bonds, municipal bonds, mortgage-backed bonds, emerging market bonds, and junk bonds.

15. The method of claim 1 wherein the securities comprise money market instruments.

16. The method of claim 15 wherein the money market instruments comprise one of United States treasury bills, bank certificates of deposit, commercial paper and repurchase agreements.

17. The method of claim 1 wherein:
    providing the bid mechanism comprises providing a bid mechanism for receiving at least one competitive bid and at least one non-competitive bid having a desired quantity of securities and no price limitation; and
    providing the allocation of the securities comprises providing an allocation of the securities which allows winning bidders to pay a single market-clearing price that sells out the securities, the allocation allocating securities to non-competitive bids before allocating securities to competitive bids.

18. The computer program product of claim 12 wherein the securities comprise equity securities or debt securities.

19. The computer program product of claim 12 wherein the securities comprise commodities.

20. The computer program product of claim 19 wherein the commodities comprise gold, or silver or other commodities traded on a licensed commodity exchange.

21. The computer program product of claim 12 wherein the bid mechanism comprises an open Dutch auction process.

22. The computer program product of claim 12 wherein an identity of a bidder that entered a particular competitive bid is not revealed in association with the initial price of the particular competitive bid.

23. The computer program product of claim 18 wherein the debt securities comprise one of corporate bonds, municipal bonds, mortgage-backed bonds, emerging market bonds, and junk bonds.

24. The computer program product of claim 12 wherein the securities comprise money market instruments.

25. The apparatus of claim 24 wherein the money market instruments comprise one of United States treasury bills, bank certificates of deposit, commercial paper and repurchase agreements.

26. The computer program product of claim 12 wherein:
the bid mechanism comprises a bid mechanism for receiving at least one competitive bid and at least one non-competitive bid having a desired quantity of securities and no price limitation; and
the allocation of the securities comprises an allocation of the securities which allows winning bidders to pay a single market-clearing price that sells out the securities, the allocation allocating securities to non-competitive bids before allocating securities to competitive bids.

27. A computer implemented method for conducting an auction of securities comprising:
receiving at a computer system from auction participants over an internet a plurality of competitive bids, each bid having a quantity of securities, a public price component and a private price component;
time stamping the public price component of approved ones of the competitive bids, wherein the private price component receives the time stamp of the public price component if the private price component comes within a predetermined range from the public price component;
making the public price component and quantity of securities of time-stamped competitive bids available to auction participants over the internet and concealing the private price component in the computer system from the auction participants other than the participant who submitted the private price component; and
using the computer system to allocate securities at a single clearing price to sell all of the securities, basing the clearing price on the private price components and associated time stamps.

28. The method of claim 27 further comprising receiving from an auction participant a modification of the participant's competitive bid.

29. The method of claim 28 further comprising time stamping the modification as a new competitive bid if the modification has a private price component that falls outside the predetermined range from the public price component of the auction participant's prior competitive bid.

30. The method of claim 28 further comprising time stamping the modification as a new competitive bid if the modification has a quantity of securities that exceeds the quantity of securities of the auction participant's prior competitive bid by more than a predetermined increase.

31. The method of claim 28 further comprising continuing to associate the time stamp of the auction participant's prior competitive bid with the modification so long as the private price component still comes within the predetermined range from the public price component and the quantity of securities remains within a range between the original quantity of securities and a predetermined increase over the original quantity of securities.

32. The method of claim 27 further comprising receiving a non-competitive bid that includes a desired quantity of securities and a designated minimum spread over a benchmark treasury security.

33. The method of claim 32 wherein using the computer system to allocate the securities comprises allocating securities to non-competitive bids before allocating securities to competitive bids.

* * * * *